United States Patent
Hayakawa et al.

(10) Patent No.: US 11,434,623 B2
(45) Date of Patent: Sep. 6, 2022

(54) WORK-IMPLEMENT EXTERNAL-SHAPE MEASUREMENT SYSTEM, WORK-IMPLEMENT EXTERNAL-SHAPE DISPLAY SYSTEM, WORK-IMPLEMENT CONTROL SYSTEM AND WORK MACHINE

(71) Applicant: HITACHI CONSTRUCTION MACHINERY CO., LTD., Tokyo (JP)

(72) Inventors: Naoki Hayakawa, Ushiku (JP); Kohei Hiromatsu, Ushiku (JP); Daito Sakai, Tsuchiura (JP); Shiho Izumi, Hitachinaka (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 315 days.

(21) Appl. No.: 16/644,229

(22) PCT Filed: Sep. 25, 2018

(86) PCT No.: PCT/JP2018/035525
§ 371 (c)(1),
(2) Date: Mar. 4, 2020

(87) PCT Pub. No.: WO2020/065738
PCT Pub. Date: Apr. 2, 2020

(65) Prior Publication Data
US 2021/0156121 A1   May 27, 2021

(51) Int. Cl.
| | |
|---|---|
| G06T 7/64 | (2017.01) |
| G06T 7/70 | (2017.01) |
| B60R 1/00 | (2022.01) |
| E02F 3/32 | (2006.01) |
| G01B 11/24 | (2006.01) |
| G05B 19/19 | (2006.01) |

(Continued)

(52) U.S. Cl.
CPC ............... *E02F 9/262* (2013.01); *B60R 1/00* (2013.01); *E02F 3/32* (2013.01); *E02F 9/265* (2013.01);

(Continued)

(58) Field of Classification Search
None
See application file for complete search history.

(56) References Cited

U.S. PATENT DOCUMENTS 10,725,450 B2 * 7/2020 Shinoda ........... G05B 19/41875
2016/0349034 A1 * 12/2016 Cobb ................... G01B 11/005
(Continued)

FOREIGN PATENT DOCUMENTS

| CN | 107111928 A | * | 8/2017 | ............. E02F 5/145 |
| JP | 2005-114235 A | | 4/2005 | |

(Continued)

OTHER PUBLICATIONS

International Preliminary Report on Patentability received in corresponding International Application No. PCT/JP2018/035525 dated Apr. 8, 2021.

(Continued)

*Primary Examiner* — Reza Aghevli
(74) *Attorney, Agent, or Firm* — Mattingly & Malur, PC

(57) ABSTRACT

A measurement controller (20): computes the position of a plane (S1) representing a side surface of a work implement (1A) in an image-capturing-device coordinate system (Co1) on the basis of an image of the side surface of the work implement captured by an image-capturing device (19) and an internal parameter of the image-capturing device; computes the coordinate values of a point on the work implement in the image-capturing-device coordinate system (Co1), the point corresponding to any pixel constituting the work implement on the captured image, on the basis of positional information on the pixel on the captured image and the position of the plane (S1); and converts the coordinate values of the point on the work implement in the image-capturing-device coordinate system, the point corresponding to the pixel, to coordinate values in a work-implement coordinate system (Co3) to output the coordinate values in (Continued)

the work-implement coordinate system (Co3) to a work-machine controller (50) of a hydraulic excavator (1).

13 Claims, 10 Drawing Sheets

(51) Int. Cl.
| | | |
|---|---|---|
| *G06T 11/00* | (2006.01) | |
| *H04N 5/247* | (2006.01) | |
| *E02F 9/26* | (2006.01) | |
| *G01B 11/00* | (2006.01) | |

(52) U.S. Cl.
CPC ............ *G01B 11/002* (2013.01); *G01B 11/24* (2013.01); *G05B 19/19* (2013.01); *G06T 7/64* (2017.01); *G06T 7/70* (2017.01); *G06T 11/00* (2013.01); *H04N 5/247* (2013.01); *B60R 2300/30* (2013.01); *G05B 2219/39393* (2013.01); *G06T 2207/30204* (2013.01)

(56) References Cited

U.S. PATENT DOCUMENTS

| | | | | |
|---|---|---|---|---|
| 2017/0114526 | A1* | 4/2017 | Yasuda | ............. E02F 9/264 |
| 2018/0245311 | A1* | 8/2018 | Shike | ............ G01C 3/06 |
| 2018/0245314 | A1* | 8/2018 | Yamaguchi | ............. E02F 9/264 |
| 2018/0275639 | A1* | 9/2018 | Shinoda | ............... G05B 19/404 |
| 2019/0073762 | A1* | 3/2019 | Kean | .................. G01C 21/3602 |
| 2019/0078294 | A1* | 3/2019 | Nagato | ................ G01B 11/245 |
| 2019/0253641 | A1 | 8/2019 | Matsuda | |
| 2021/0094535 | A1* | 4/2021 | Thompson | ........ B60W 40/1005 |

FOREIGN PATENT DOCUMENTS

| | | | | |
|---|---|---|---|---|
| JP | 2005114235 A | * | 4/2005 | ............ F41H 11/136 |
| JP | 2016-089388 A | | 5/2016 | |
| JP | 2016089388 A | * | 5/2016 | ............... G06T 7/64 |
| WO | 2016/056674 A1 | | 4/2016 | |
| WO | WO-2016056674 A1 | * | 4/2016 | ............. E02F 3/963 |
| WO | WO-2018043299 A1 | * | 3/2018 | ............ B60K 35/00 |
| WO | 2018/062523 A1 | | 4/2018 | |
| WO | WO-2019054003 A1 | * | 3/2019 | ............... B60R 1/00 |

OTHER PUBLICATIONS

International Search Report of PCT/JP2018/035525 dated Nov. 27, 2018.
Extended European Search Report received in corresponding European Application No. 18931280.4 dated Apr. 19, 2022.

\* cited by examiner

WORK-IMPLEMENT EXTERNAL-SHAPE MEASUREMENT SYSTEM, WORK-IMPLEMENT EXTERNAL-SHAPE DISPLAY SYSTEM, WORK-IMPLEMENT CONTROL SYSTEM AND WORK MACHINE

TECHNICAL FIELD

The present invention relates to a work-implement external-shape measurement system including a measurement controller that measures the shape of a work implement mounted on a work machine.

BACKGROUND ART

In recent years, in order to respond to computerized construction, some work machines including hydraulic excavators include: (1) a machine guidance (MG) function that senses the position and posture of a work implement (a front work implement) such as a boom, an arm or a bucket by a sensor, and provides to an operator an image of the bucket at the position and posture in line with the sensor information by displaying the image on a monitor; and (2) a machine control (MC) function that uses sensor information on the position and posture of the work implement in a similar manner to MG to control the work implement in accordance with a predetermined condition. Typically, in a hydraulic excavator equipped with such functions, an image of a bucket as seen in a side view is displayed on a monitor in a cab along with a target surface in order to let an operator know an actual relative positional relationship between the bucket and the target surface.

In relation to this type of technology, Patent Document 1 discloses a technology like the following one from the perspective of reducing a sense of discomfort felt by an operator when images of a plurality of types of buckets are displayed on a monitor. That is, Patent Document 1 discloses a display system for a work machine having a work implement to which a bucket is attached, the display system including: a generating section that uses information on the shape and dimensions of the bucket to generate drawing information for drawing an image of the bucket as seen in a side view; and a display section that displays the image of the bucket in the side view on the basis of the drawing information generated by the generating section, and an image indicating a cross-section of a terrain profile. In the display system, the information on the shape and dimensions of the bucket includes: in a side view of the bucket, a distance between the blade tip of the bucket and a bucket pin used to attach the bucket to the work implement; an angle formed between a straight line linking the blade tip and the bucket pin, and a straight line indicating the bottom surface of the bucket; a position of the blade tip; a position of the bucket pin; and at least one position of the external surface of the bucket, the one position being located between a portion at which the bucket is coupled to the work implement and the blade tip.

PRIOR ART DOCUMENT

Patent Document

Patent Document 1: WO2016/56674

SUMMARY OF THE INVENTION

Problem to be Solved by the Invention

Meanwhile, from the perspective of improving the degree of accuracy of MG and MC explained above, accurate external-shape information on work implements including buckets is required.

Since work implements including buckets are typically manufactured by manual work of workers such as welding, they are finished in shapes different from those in design data due to deformation, positional misalignment and the like in the process. Accordingly, external-shape information on work implements is typically acquired by performing measurement by using a tape measurement, measurement by using a total station, and the like for each work machine. In these techniques, the posture of a work implement should be restricted and a large-scale measurement device needs to be used in order to attain sufficient measurement precision. Moreover, accurately displaying the shape of the work implement in line with its actual shape on a monitor requires measurement of as many points as possible to be performed in advance, and this is a very cumbersome work.

Accordingly, there are almost no work implements for which external-shape information is registered accurately in line with real objects. In many cases, the position of only one representative point (e.g. the bucket-claw tip) or the positions of several representative points on the external shape of a work implement is/are registered, and such circumstances have become an obstacle to realization of accurate MG and/or MC. That is, there is a fear that, in MC, a point whose position on the external shape of a work implement is not registered contacts a target surface, resulting in unintended deformation or damages of the target surface, and, in MG, a wrong distance may be presented on a monitor in a case where a point on the external shape that is actually positioned at the shortest distance to a target surface is not registered.

An object of the present invention is to provide a measurement system that allows simple and easy measurement of external-shape information on a work implement, and a display system and a control system that use the measurement system to assist an operator in shaping a target surface precisely, and further to provide a work machine including the measurement system, the control system and the display system.

Means for Solving the Problem

The present application includes a plurality of means for solving the problems explained above, and if one example of the means is to be mentioned, it is a work-implement external-shape measurement system including a measurement controller that measures a shape of a work implement mounted on a work machine, the work-implement external-shape measurement system including an image-capturing device that captures an image of a side surface of the work implement. In the work-implement external-shape measurement system, the measurement controller: computes a position of a plane representing the side surface of the work implement in an image-capturing-device coordinate system that is a three-dimensional coordinate system set for the image-capturing device, the position being computed on a basis of the image of the side surface of the work implement, the image being captured by the image-capturing device, and an internal parameter of the image-capturing device; computes a coordinate value of a point on the work implement in the image-capturing-device coordinate system, the point corresponding to any pixel constituting the work implement on the image, on a basis of information on a position of the pixel on the image, and the position of the plane; and converts the coordinate value of the point on the work implement in the image-capturing-device coordinate system, the point corresponding to the pixel, to a coordinate value in a work-implement coordinate system that is a two-dimensional coordinate system set for the work implement, and outputs the coordinate value in the work-implement coordinate system to a work-machine controller of the work machine.

Advantages of the Invention

The present invention allows simple and easy measurement of external-shape information on a work implement.

MODES FOR CARRYING OUT THE INVENTION

Figure 1:
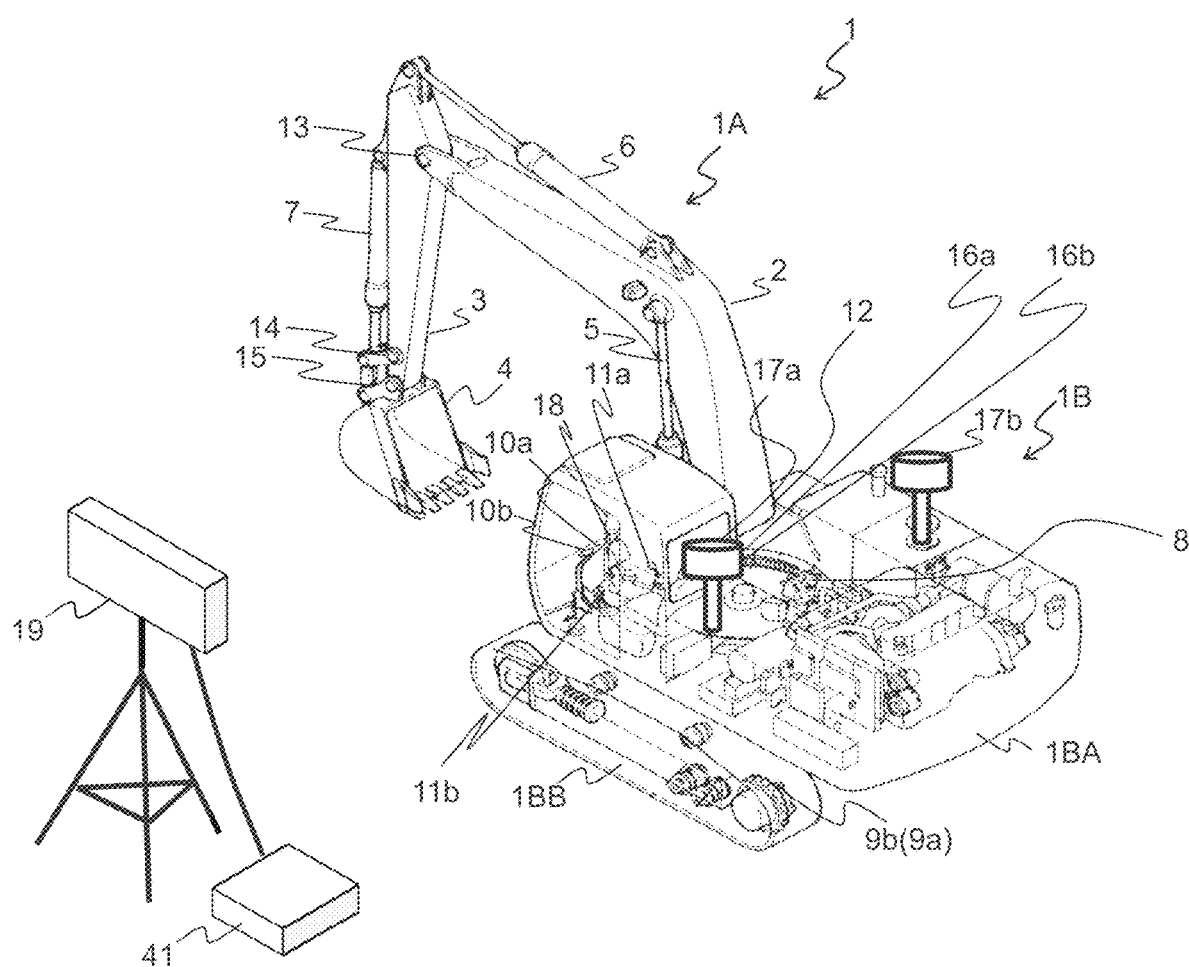
FIG. 1 is a configuration diagram of a hydraulic excavator and an image-capturing device according to a first embodiment of the present invention.

Hereinafter, embodiments of the present invention are explained by using the drawings. Note that although hereinafter a hydraulic excavator including a bucket 4 as an attachment to the tip of a work implement (front work implement) is illustrated as an example of a work machine to which the present invention is applied, the present invention may be applied to a hydraulic excavator including an attachment other than a bucket. In addition, the present invention can be applied also to a work machine other than a hydraulic excavator as long as the work machine has a work implement like a wheel loader, for example. Furthermore, in the following explanation, among a plurality of front-implement members (specifically, a boom 2, an arm 3 and the bucket 4) included in a work implement 1A, one or more front-implement members whose shapes are desired to be measured by a measurement controller 20 (positions in a work-implement coordinate system Co3 (mentioned below) of points on the work implement 1A) are referred to as work implements in some cases.

First Embodiment

In a first embodiment, a system including an image-capturing device (e.g. a camera) 19, a measurement controller 20 and a work-machine controller 50 is explained. The image-capturing device 19 captures an image of the work implement 1A mounted on a hydraulic excavator (work machine) 1. The measurement controller 20 uses an image of a side surface of the work implement 1A (hereinafter, referred to as a "work-implement side-surface image" in some cases) captured by the image-capturing device 19, to measure shape-related information on the work implement 1A. The work-machine controller 50 is mounted on the hydraulic excavator 1, and receives an input of the shape-related information on the work implement 1A calculated at the measurement controller 20, to use the shape-related information for MG and/or MC, for example, executed at the hydraulic excavator 1.

Figure 2:
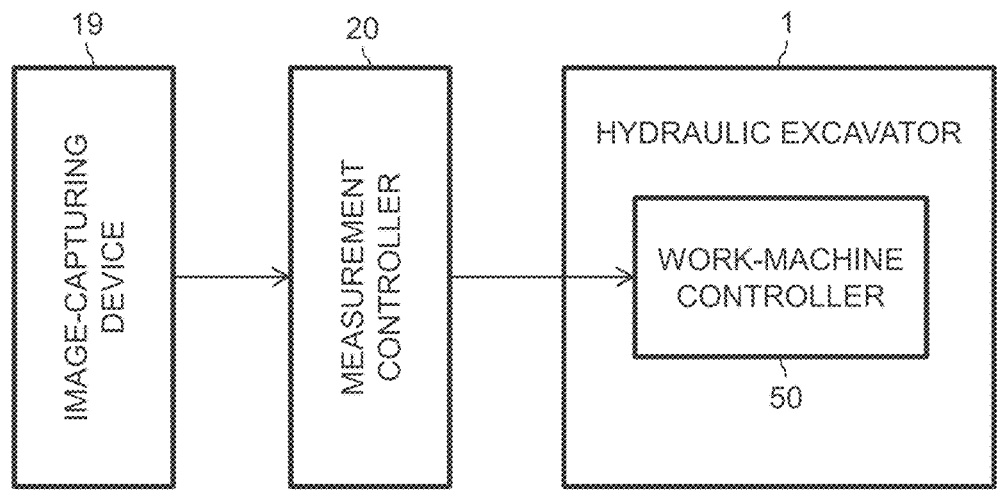
FIG. 2 is a configuration diagram of a system according to the first embodiment of the present invention.

FIG. 1 is a configuration figure of the hydraulic excavator 1, and the image-capturing device 19 and the measurement controller 20 according to an embodiment of the present invention. In addition, FIG. 2 is a configuration figure of the system of the present embodiment. As illustrated in FIG. 2, the system of the present embodiment includes the hydraulic excavator 1 equipped with the work-machine controller 50, and the image-capturing device 19 and the measurement controller 20 that are installed at a position located apart from the hydraulic excavator 1. The image-capturing device 19 is a camera that captures photographs (images) of a side surface of the work implement 1A. The measurement controller 20 computes the position of a plane representing the side surface of the work implement 1A. On the basis of the position of the plane and an image captured by the image-capturing device 19, the measurement controller 20 generates a work-implement-1A drawing image and the coordinate values, in a work-implement coordinate system Co3, of a point on the side surface of the work implement 1A. The work-machine controller 50 mounted on the hydraulic excavator 1 provides a machine guidance (MG) function and a machine control (MC) function. As shape information and drawing information on the work implement 1A for the MG/MC, the work-machine controller 50 uses the work-implement-1A drawing image and the coordinate values, in the work-implement coordinate system Co3, of the point on the side surface of the work implement 1A, the coordinate values being output by the measurement controller 20.

The measurement controller 20 and the work-machine controller 50 are controllers each having: a processing device (e.g. a CPU); and a storage device (e.g. a semiconductor memory such as a ROM or a RAM) storing a program to be executed by the processing device. The controllers 20 and 50 of the present embodiment each receive information and signals from an external device (e.g. the image-capturing device 19, a target-surface-data input device 37 (see FIG. 9), various types of sensors 12, 13, 14, 16 and 17, and operation levers 10 and 11), to perform various types of calculation required for generation of the coordinate values and a drawing image of the work implement 1A, and various types of calculation related to display on a display monitor (display device) 18 installed in a cab of the hydraulic excavator 1 and related to operation of the hydraulic excavator 1. Specific contents of the calculation executed by the measurement controller 20 and the work-machine controller 50 are mentioned below by using functional block diagrams of FIG. 4 and FIG. 9.

As illustrated in FIG. 1, the hydraulic excavator 1 is constituted by: the articulated-type work implement (front work implement) 1A configured by coupling a plurality of front-implement members (the boom 2, the arm 3 and the bucket 4) that pivot in the vertical direction individually; and a machine body 1B including an upper swing structure 1BA and a lower track structure 1BB. The base end of the boom 2 positioned closer to the base end side of the work implement 1A is supported at a front portion of the upper swing structure 1BA so as to be pivotable upward/downward. The upper swing structure 1BA is attached swingably at an upper portion of the lower track structure 1BB. In addition, the image-capturing device 19 for capturing photographs of a side surface of the work implement 1A, and the measurement controller 20 are installed on a side of the work implement 1A. Internal parameters of the image-capturing device 19 (e.g. the focal length (f), the image-sensor size (vertical h and horizontal w), the pixel count (vertical H and horizontal W), the unit-cell size, the image-center coordinates, etc.) are known.

The image-capturing device 19 is a monocular camera including an image-capturing element (image sensor) such as a CCD (Charge Coupled Device) or a CMOS (Complementary Metal Oxide Semiconductor). The image-capturing device 19 outputs data of captured images to the measurement controller 20. Further, the image-capturing device 19 may be substituted by a stereo camera that can acquire depth information (information on a distance to a subject) by using parallax, or a camera that can acquire depth information by emitting laser light or the like to measure time of arrival of reflected light thereof, in addition to acquire image information. Note that the measurement controller 20 may be built in the image-capturing device 19.

The boom 2, the arm 3, the bucket 4, the upper swing structure 1BA and the lower track structure 1BB constitute driven members driven by a boom cylinder 5, an arm cylinder 6, a bucket cylinder 7, a swing hydraulic motor 8 and left and right travel hydraulic motors 9a and 9b (hydraulic actuators), respectively. Operation of the plurality of driven members is controlled by pilot pressures produced by a travel-right lever 10a, a travel-left lever 10b, an operation-right lever 11a and an operation-left lever 11b (which are collectively referred to as operation levers 10 and 11 in some cases) that are installed in the cab on the upper swing structure 1BA being operated by an operator. The pilot pressures to drive the plurality of driven members explained above include not only pressures output by operation of the operation levers 10 and 11, but also pressures output through operation operated, independently of operation of the operation levers 10 and 11, by some (pressure-increasing valves) of a plurality of proportional solenoid valves 39 (see FIG. 9) mounted on the hydraulic excavator 1, and pressures produced by reducing pilot pressures output by operation of the operation levers 10 and 11 due to some (pressure-reducing valves) of the plurality of proportional solenoid valves 39 being operated. In this manner, the pilot pressures output from the plurality of proportional solenoid valves 39 (pressure-increasing valves, and pressure-reducing valves) trigger MC to operate the boom cylinder 5, the arm cylinder 6 and the bucket cylinder 7 in accordance with a predetermined condition.

Figure 3:
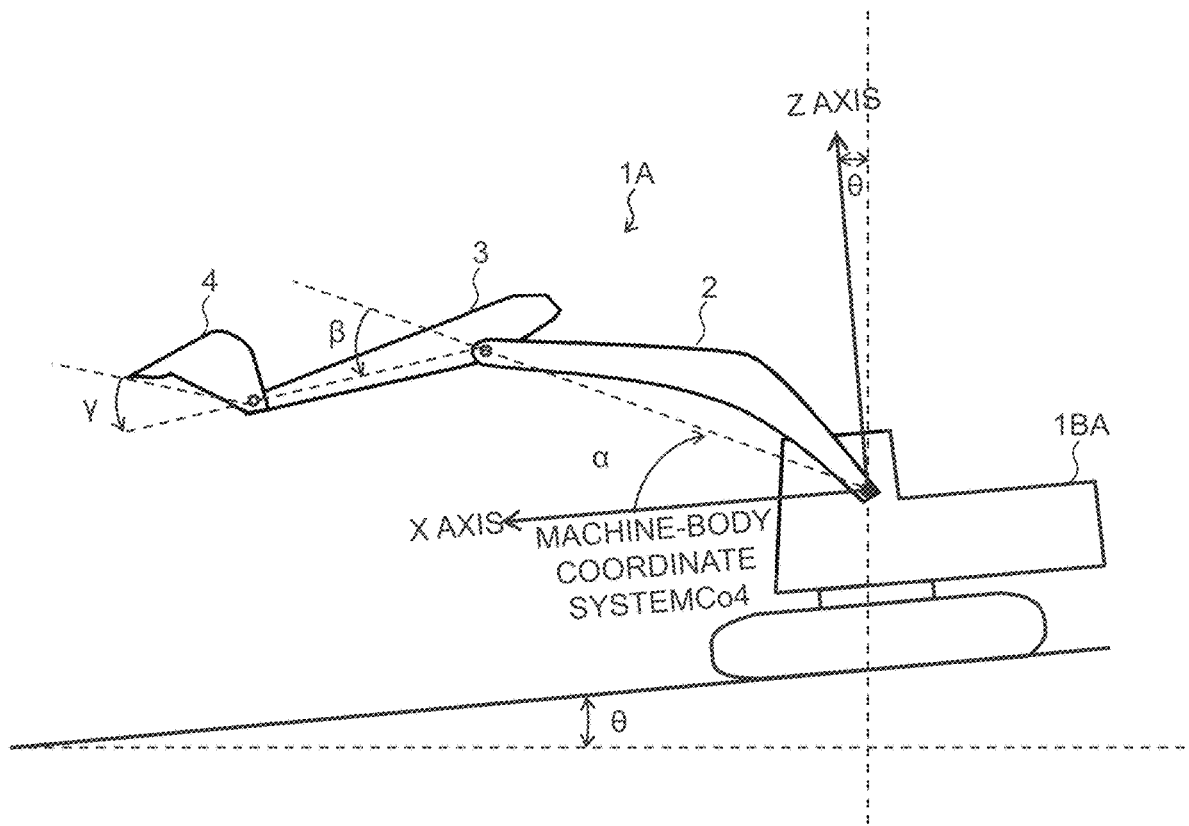
FIG. 3 is a figure representing a coordinate system relative to the hydraulic excavator.

In the work implement 1A, the boom-angle sensor 12, the arm-angle sensor 13, and the bucket-angle sensor 14 are attached to a boom pin, an arm pin and a bucket link 15, respectively, such that the angles of pivoting motion α, β and γ (see FIG. 3) of the boom 2, the arm 3 and the bucket 4 can be measured. A machine-body front-rear-inclination-angle sensor 16a and a machine-body left-right-inclination-angle sensor 16b are attached to the upper swing structure 1BA. The machine-body front-rear-inclination-angle sensor 16a senses a front-rear-direction inclination angle θ (see FIG. 3) of the upper swing structure 1BA (machine body 1B) relative to a reference plane (e.g. a horizontal plane). The machine-body left-right-inclination-angle sensor 16b senses a left-right-direction inclination angle φ (not illustrated) of the upper swing structure 1BA (machine body 1B) relative to the reference plane. Note that the X axis and the Z axis illustrated in FIG. 3 represent a machine-body coordinate system Co4 having its origin at a point (e.g. the middle point) on the shaft center of the boom pin, and having the Z axis along the machine-body upward direction, the X axis along the machine-body front direction, and the Y axis along the machine-body rightward direction.

A first GNSS antenna 17a and a second GNSS antenna 17b are arranged on the upper swing structure 1BA. The first GNSS antenna 17a and the second GNSS antenna 17b are antennas for the RTK-GNSS (Real Time Kinematic-Global Navigation Satellite Systems), and receive radio waves (navigation signals) emitted from a plurality of GNSS satellites. The work-machine controller 50 can measure the latitude, longitude and height (ellipsoidal height) of the position of each antenna on the basis of lengths of time required for radio waves emitted from a plurality of GNSS satellites to reach the first and second GNSS antennas 17a and 17b. Thereby, the position and orientation of the hydraulic excavator 1 (upper swing structure 1BA) in a geographic coordinate system (global coordinate system) Co5 which is a three-dimensional coordinate system can be calculated. Note that a configuration may be adopted in which the positions and heights of the first and second GNSS antenna 17a and 17b are calculated by a dedicated receiving section, and a result of the calculation is output to the work-machine controller 50.

On a screen of the display monitor 18 in the cab of the hydraulic excavator 1, an image of the work implement 1A as seen in a side view and a cross-sectional shape of a target surface are displayed on the basis of postural information on the work implement 1A calculated from outputs of various types of the posture sensors 12, 13, 14 and 16, positional information on the upper swing structure 1BA calculated from reception signals of the GNSS antennas 17a and 17b, and/or the like. The image of the work implement 1A as seen in the side view is generated at the measurement controller 20 on the basis of a work-implement side-surface image captured by the image-capturing device 19. Next, a process of generating coordinate values and a drawing image of the work implement 1A on the work-implement coordinate system Co3, which is executed by the measurement controller 20 on the basis of the work-implement side-surface image of the image-capturing device 19, is explained by using drawings.

(Configuration of Measurement Controller)

Figure 4:
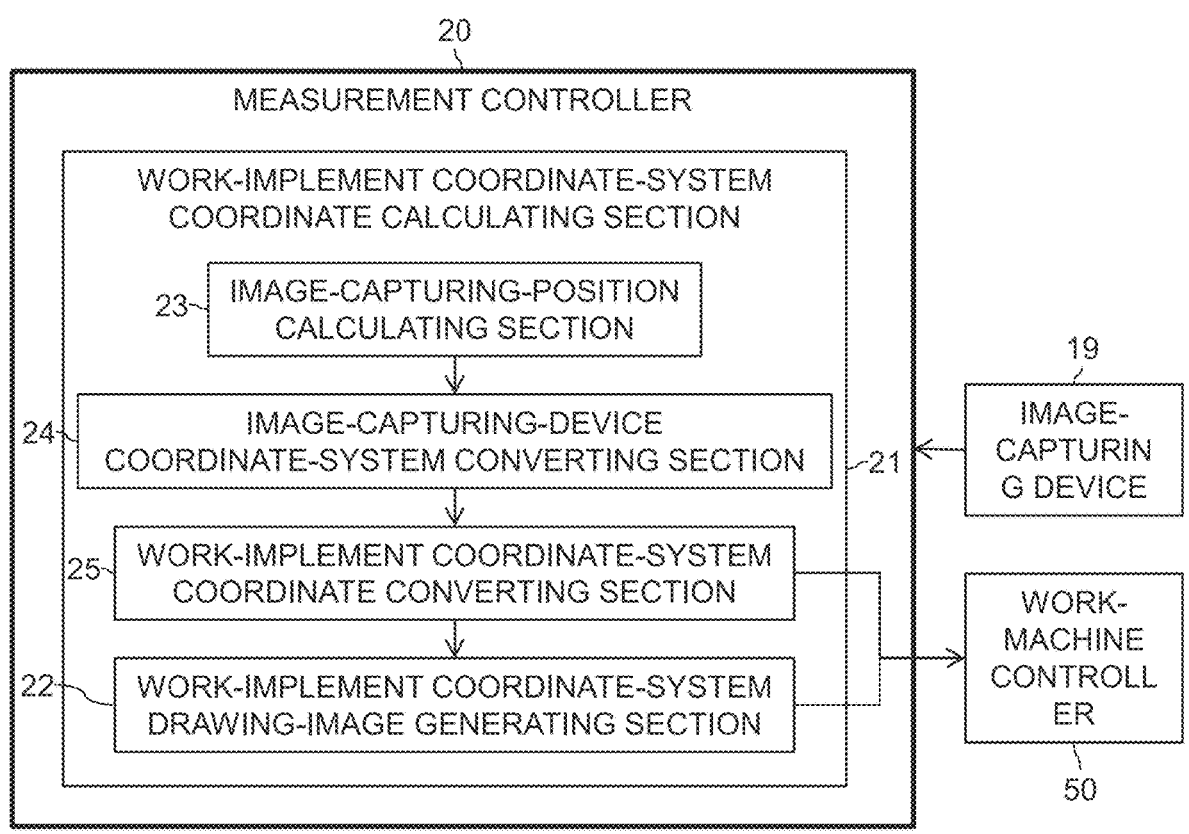
FIG. 4 is a functional block diagram of a work-implement external-shape measurement system according to the first embodiment of the present invention.

FIG. 4 is a functional block diagram of the measurement controller 20 according to an embodiment of the present invention. As illustrated in this figure, the measurement controller 20 includes a work-implement coordinate-system coordinate calculating section 21 that calculates the coordinate values of the work implement 1A in the work-implement coordinate system Co3, and a work-implement coordinate-system drawing-image generating section 22 that generates a work-implement-1A drawing image in the work-implement coordinate system Co3. The measurement controller 20 receives an input of a side-surface photograph of the work implement 1A captured by the image-capturing device 19.

The work-implement coordinate-system coordinate calculating section 21 includes: an image-capturing-position calculating section 23 that computes the position of a plane representing a side surface of the work implement 1A in an image-capturing-device coordinate system Co1 which is a three-dimensional coordinate system set for the image-capturing device 19; an image-capturing-device coordinate-system coordinate converting section 24 that computes the coordinate values, in the image-capturing-device coordinate system Co1, of points on the work implement 1A (hereinafter, referred to as "work-implement corresponding points" in some cases) corresponding to pixels included in pixels constituting the work implement 1A (hereinafter, referred to as "work-implement constituting pixels" in some cases) on a work-implement side-surface image captured by the image-capturing device 19; and a work-implement coordinate-system coordinate converting section 25 that converts the coordinate values of the work-implement corresponding points in the image-capturing-device coordinate system Co1 to coordinate values in the work-implement coordinate system Co3. The work-implement coordinate-system coordinate calculating section 21 uses as an input a side-surface image of the work implement 1A (work-implement side-surface image) captured by the image-capturing device 19, and outputs the coordinate values, in the work-implement coordinate system Co3, of work-implement corresponding points of work-implement constituting pixels designated on the work-implement side-surface image.

Note that when a work-implement side-surface image captured by the image-capturing device 19 is input, a process of performing distortion correction on the work-implement side-surface image on the basis of an internal parameter of the image-capturing device 19 may be executed at the measurement controller 20. In addition, in the case described in the present embodiment, coordinate values in the work-implement coordinate system Co3 (work-implement coordinate-system coordinate values) are output for work-implement corresponding points of all pixels on a contour line which is the boundary line between a work-implement side-surface section and other sections (background) in a work-implement side-surface image. Other methods that may be adopted include: a method in which work-implement coordinate-system coordinate values are output for work-implement corresponding points of all pixels of a work-implement side-surface section (i.e. all pixels in the contour line of the work-implement side-surface section) on a work-implement side-surface image; a method in which work-implement coordinate-system coordinate values are output for work-implement corresponding points of pixels on a work-implement side-surface section that are designated by a user via some input interface; and the like.

On the basis of an image of a side surface of the work implement 1A (a work-implement side-surface image) captured by the image-capturing device 19, and an internal parameter of the image-capturing device 19, the image-capturing-position calculating section 23 computes the position of a plane S1 (mentioned below; see FIG. 8) representing the side surface of the work implement 1A in the image-capturing-device coordinate system Co1 which is a three-dimensional coordinate system set for the image-capturing device 19. In the present embodiment, the position of the plane S1 in the image-capturing-device coordinate system Co1 is identified with an equation for the plane S1 in the image-capturing-device coordinate system Co1.

Figure 5:
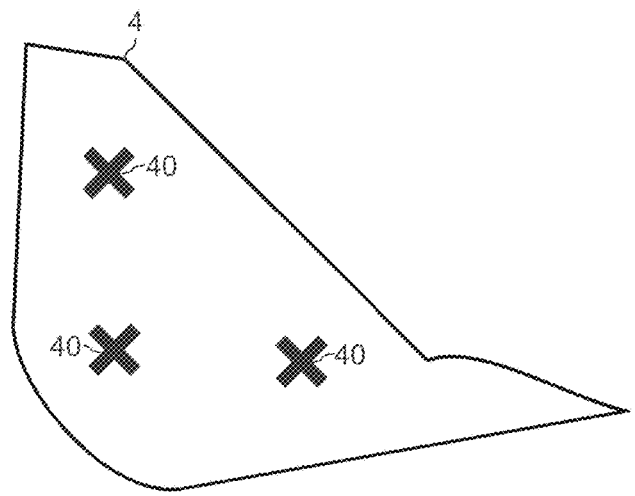
FIG. 5 is a figure illustrating an example of known-point markers attached on a work-implement side surface.

In the present embodiment, in a method adopted for computation, by the image-capturing-position calculating section 23, of the equation for the plane S1 representing the work implement 1A, three markers (known-point markers) 40 whose distances to each other on a side surface of the work implement 1A captured by the image-capturing device 19 are known are installed at such positions that the known-point markers 40 form a triangle as illustrated in FIG. 5. In the present embodiment, the positions (coordinates) in the image-capturing-device coordinate system Co1 of the three known-point markers 40 are calculated from the pixel positions in the work-implement side-surface image of the three markers 40, and the equation for the plane S1 is calculated from the positions of the three points. Note that since an image of the work implement 1A displayed on the display monitor 18 is typically a side-surface image in the field of work machines including hydraulic excavators, three markers are preferably arranged on a surface parallel to an operation plane of the work implement 1A (e.g. a surface orthogonal to the boom pin) such that the plane S1 becomes parallel to the operation plane, but it is allowed to arrange three markers on a surface that crosses the operation plane (i.e. a surface not parallel to the operation plane). Since it is only required that the plane should be able to be defined by known-point markers 40, four or more known-point markers 40 may be attached to a side surface of the work implement 1A, and an equation for the plane S1 on which all the markers 40 are positioned may be obtained.

Markers 40 are objects having features such as predetermined sizes, colors, pattern, shapes or properties, and markers may be used that include: markers that reflect light with a particular wavelength; markers that reflect light in a particular direction; AR markers used in AR (Augmented Reality) technology; and markers that include two-dimensional codes like QR codes (registered trademark).

FIG. 5 illustrates a specific example of known-point markers 40 in the present embodiment. In the present embodiment, three known-point markers 40 are installed so as not to be positioned collinearly on a side surface of the bucket 4, and the plane is computed by obtaining the coordinate values of the three known-point markers 40. Note that for the arrangement positions of the three markers 40, three straight lines may be drawn on a work-implement side surface, and the three markers 40 may be arranged at three intersections at which the three straight lines cross.

Figure 6:
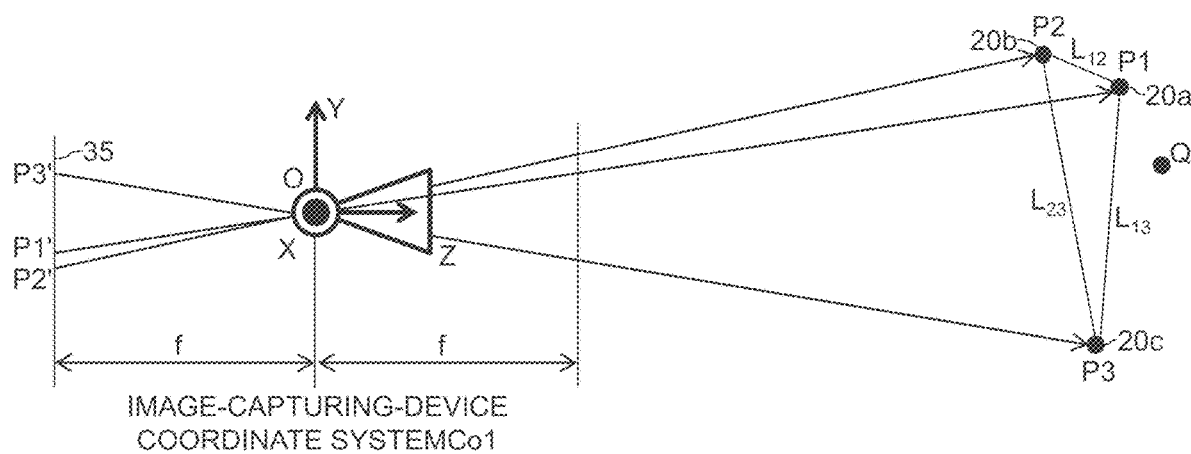
FIG. 6 is a figure illustrating a positional relationship between the image-capturing device and known-point markers on the work-implement side surface in an image-capturing-device coordinate system.

FIG. 6 is a figure representing a positional relationship between an image-capturing device of the image-capturing device 19, and known-point markers 40 (P1, P2 and P3) on a work-implement side surface, in the image-capturing-device coordinate system Co1. The image-capturing-device coordinate system Co1 is a coordinate system having its origin O at the lens center of the image-capturing device 19, and having the Z axis along the direction of the optical axis, the Y axis in the upward direction of the image-capturing device 19, and the X axis along the rightward direction. In addition, the unit of coordinate values in the image-capturing-device coordinate system Co1 is a unit of length like millimeter, for example. The points P1 to P3 are the positions of the known-point markers 40, and a point on the work-implement side surface similar to the points P1 to P3 is defined as Q. $L_{ij}$ (i, j=1 to 3, i≠j) is the distance between a point Pi and a point Pj (the distance between two known-point markers 40). Here, $L_{ij}$ is a known value. In addition, an image sensor 35 of the image-capturing device 19 is on the plane of Z=−f when the focal length of the image-capturing device 19 is f.

Figure 7:
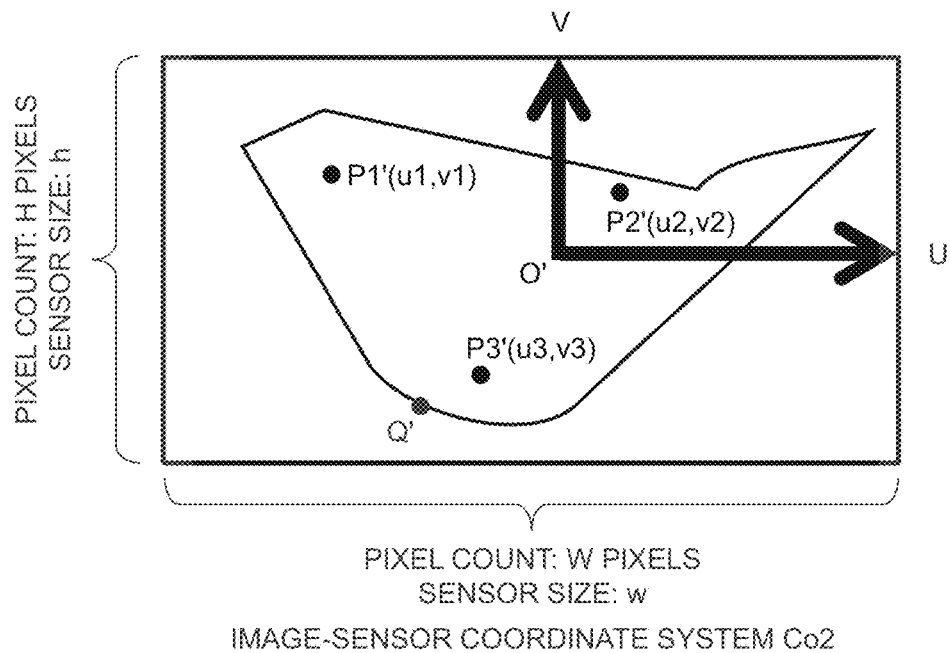
FIG. 7 is a figure illustrating a positional relationship of an image in an image-sensor coordinate system.

FIG. 7 represents images of the points P1 to 3 and the point Q that are formed on the image sensor 35 of the image-capturing device 19, and points P1' to P3' and Q' are the positions of the images of the points P1 to P3 and Q, respectively. Here, a two-dimensional coordinate system having its origin O' at the center of the optical axis, and having the U axis along the rightward direction of the sensor, and the V axis along the upward direction of the sensor is defined as an image-sensor coordinate system Co2. If the size of the image sensor is h and w in the vertical direction and the horizontal direction, respectively, and the pixel count of the image sensor is H pixels and W pixels in the vertical direction and the horizontal direction, respectively, when each of the points P1' to P3' is formed at a pixel (Uk, Vk) (k=1 to 3; the unit of Uk and Vk is pixel), the coordinates in the image-capturing-device coordinate system Co1 of each of the point P1' to P3' can be expressed by the following Formula (1).

[Equation 1]

$$\overrightarrow{OP_k'} : \left( U_k \times \frac{h}{H}, V_k \times \frac{w}{W}, -f \right) \quad \text{Formula (1)}$$

At this time, since the point O, which is the lens center of the image-capturing device 19, and the points Pk and Pk' (k=1 to 3) are positioned collinearly as illustrated in FIG. 6, the point O and the points Pk and Pk' can be expressed by the following Formula (2).

[Equation 2]

$$\overrightarrow{OP_k} = r_k \overrightarrow{OP_k'} \quad \text{Formula (2)}$$

Note that $r_k$ (k=1 to 3) is a factor of proportionality, and is an unknown value at this step. The coordinates in the image-capturing-device coordinate system Co1 of the point Pk (k=1 to 3) can be represented by the following Formula (3) by using $r_k$.

[Equation 3]

$$OP_k : (r_k \cdot x_k, r_k \cdot y_k, r_k \cdot -f) \quad \text{Formula (3)}$$

$$\text{Where, } x_k = U_k \times \frac{h}{H}, y_k = V_k \times \frac{w}{W}$$

At this time, the distances $L_{ij}$ (i, j=1 to 3; i≠j) between the known-point markers 40 can be expressed by the following Formula (4).

[Equation 4]

$$L_{ij}^2 = (r_i x_i - r_j x_j)^2 + (r_i y_i - r_j y_j)^2 + f^2(r_i - r_j)^2 \quad \text{Formula (4)}$$

Since the distances $L_{ij}$ (i, j=1 to 3, i≠j) between the three known-point markers 40 are known, three simultaneous equations can be derived from the values of $L_{12}$, $L_{23}$ and $L_{31}$. $r_k$ (k=1 to 3) can be obtained by solving the simultaneous equations, and the coordinates of the point Pk (k=1 to 3) (i.e. the coordinates of the three known-point markers 40) in the image-capturing-device coordinate system Co1 are obtained from Formula (3) explained above.

By substituting different values among 1 to 3 for i, j and k, and defining c as a non-zero constant, a normal vector n (see FIG. 8) on the plane S1 (see FIG. 8) representing a side surface of the work implement 1A can be expressed by the following Formula (5).

[Equation 5]

$$\vec{n} = c \cdot \overrightarrow{P_i P_j} \times \overrightarrow{P_i P_k} \quad \text{Formula (5)}$$

Then, an equation related to the point Q on the plane S1 representing the side surface of the work implement 1A is obtained in the following manner from the coordinates, in the image-capturing-device coordinate system Co1, of the point Pk (k=1 to 3).

[Equation 6]

$$\vec{n} \cdot \overrightarrow{QP_k} = \vec{n} \cdot (\overrightarrow{OP_k} - \overrightarrow{OQ}) = 0 \quad \text{Formula (6)}$$

Next, on the basis of positional information on a work-implement constituting pixel on the work-implement side-surface image and the equation computed at the image-capturing-position calculating section 23, the image-capturing-device coordinate-system coordinate converting section 24 computes the coordinate values, in the image-capturing-device coordinate system Co1, of work-implement corresponding points of the work-implement constituting pixels. Specifically, the image-capturing-device coordinate-system coordinate converting section 24 extracts, by image processing, the contour line of the work implement 1A from the work-implement side-surface image captured by the image-capturing device 19, and obtains the coordinate values, in the image-capturing-device coordinate system Co1, of work-implement corresponding points of pixels positioned on the extracted contour line (work-implement constituting pixels) on the basis of the pixel positional information and the equation related to the point Q (the equation for the plane S1).

Here, a method of obtaining the coordinates in the image-capturing-device coordinate system Co1 of a point on the work implement 1A (a work-implement corresponding point) corresponding to a point whose image is formed at a pixel position (U, V) (i.e. a work-implement constituting pixel) corresponding to a point on the work-implement side surface is as follows. Here, a point whose image is formed on the image sensor (a work-implement constituting pixel) corresponding to a point Q (a work-implement corresponding point) on the plane S1 of the work-implement side surface is defined as a point Q'. When the pixel position of the point Q' is (U, V), the point Q' can be expressed by the following Formula (7) in a similar manner to Formula (1) explained above.

[Equation 7]

$$\overrightarrow{OQ'} : \left( U \times \frac{h}{H}, V \times \frac{w}{W}, f \right) \quad \text{Formula (7)}$$

Since the point Q', the origin O and the point Q are collinear, the straight line OQ can be expressed by the following Formula (8) by using Formula (7) explained above.

[Equation 8]

$$\overrightarrow{OQ} = t \cdot \overrightarrow{OQ'} \quad \text{Formula (8)}$$

Therefore, the position (coordinates) of the point Q (work-implement corresponding point) in the image-capturing-device coordinate system Co1 is obtained from the intersection between the equation for the plane S1 (Formula (6) explained above) representing the side surface of the work implement 1A, and the equation for a straight line passing through the point Q' on the image sensor and the origin O (Formula (8) explained above).

The work-implement coordinate-system coordinate converting section 25 converts the coordinate values of the work-implement corresponding point (the position of the point Q) in the image-capturing-device coordinate system Co1 to coordinate values in the work-implement coordinate system Co3, and outputs, to the work-machine controller 50 and the work-implement coordinate-system drawing-image generating section 22, the coordinate values after the conversion (hereinafter, referred to as "work-implement coordinate-system coordinate values" in some cases). Here, the work-implement coordinate system Co3 is a two-dimensional coordinate system set on the plane S1 representing a side surface of the work implement 1A for which an equation is obtained at the image-capturing-position calculating section 23, and the unit of coordinate values in the work-implement coordinate system Co3 is a unit of length like millimeter, for example. The work-implement coordinate system Co3 has its origin at the pivot of the work implement 1A, an has the x axis along the work-implement-tip direction, and the y axis along the direction orthogonal to the x axis.

Figure 8:
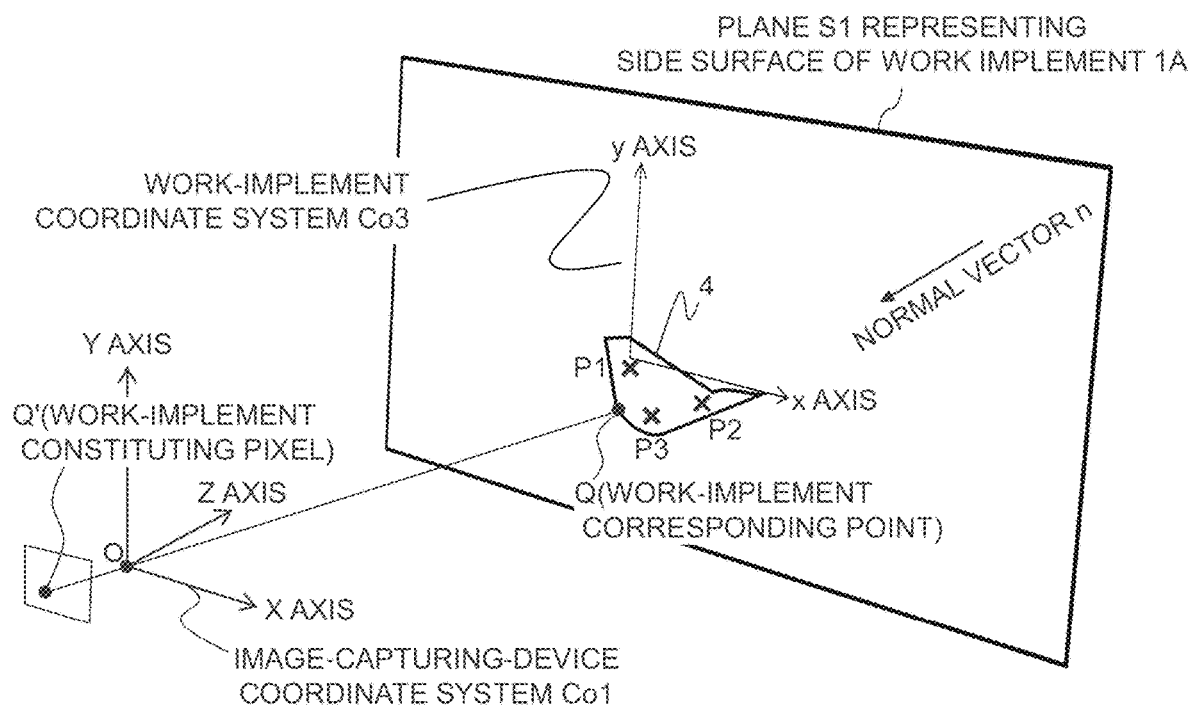
FIG. 8 is a figure illustrating a relationship between the image-capturing-device coordinate system and a work-implement coordinate system.

FIG. 8 is a diagram illustrating the relationship between the plane S1 representing a side surface of the work implement 1A, the work-implement coordinate system Co3, and the image-capturing-device coordinate system Co1 in the present embodiment. In FIG. 8, the bucket 4 among a plurality of front-implement members 2, 3 and 4 constituting the articulated-type work implement 1A is treated as a target, the origin of the work-implement coordinate system Co3 is set to the pivot of the bucket 4, the x axis of the work-implement coordinate system Co3 is set to a straight line from the origin toward the bucket-claw tip and the y axis of the work-implement coordinate system Co3 is set to the direction orthogonal to the x axis. Note that in a case where the work-implement coordinate system Co3 is set for points on the boom 2 or the arm 3, the origin may be set to the pivot of the base end side of the boom 2 or the arm 3, and the x axis may be set to extend toward the pivot of the arm 3 or the bucket 4 (a tip portion of each front-implement member).

Note that in a case where settings (the position of the origin, and/or the directions of the x axis and the y axis) of the work-implement coordinate system Co3 are not registered on the work-machine-controller-50 side, not only coordinate values, but also settings of the work-implement coordinate system Co3 are also output to the work-machine controller 50.

Next, a process performed at the work-implement coordinate-system drawing-image generating section 22 is explained. Although in the case illustrated and described as an example in the present embodiment, the work-implement coordinate-system coordinate calculating section 21 calculates the work-implement coordinate-system coordinates of work-implement corresponding points of all pixels on the contour line of the work implement 1A, and outputs the work-implement coordinate-system coordinates to the work-implement coordinate-system drawing-image generating section 22, the coordinates in the work-implement coordinate system Co3 of work-implement corresponding points of some pixels on the contour line may be calculated and output. In addition, the same applies also to a case where the coordinate values of work-implement corresponding points are calculated and output for: pixels on the contour line and one or more pixels included in the contour line; pixels on the contour line and all pixels included in the contour line; or one or more pixels that are among all work-implement constituting pixels and designated as desired by a user using some input interface. It should be noted, however, that since the accuracy of control of the work implement 1A in MC and the accuracy of the distance between the work implement 1A and a target surface in MG can be attained surely only with coordinate values calculated at the work-implement coordinate-system coordinate calculating section 21, the work-implement coordinate-system drawing-image generating section 22 can be omitted in a case, for example, that the accuracy of the shape of the work implement 1A displayed on the display monitor 18 is not required.

On the basis of the coordinate values of work-implement corresponding points in the work-implement coordinate system Co3 which are obtained through conversion at the work-implement coordinate-system coordinate converting section 24, the work-implement coordinate-system drawing-image generating section 22 generates a work-implement-1A drawing image in the work-implement coordinate system Co3 (hereinafter, referred to as a "work-implement coordinate-system drawing image" in some cases; this includes an image of the bucket 4 as seen in a side view, for example) and outputs the drawing image to the work-machine controller 50. Specific methods of generating a work-implement-1A drawing image include, for example, a method of executing a process of filling an area surrounded by points, on the contour line of the work implement 1A in the work-implement coordinate system Co3, output at the work-implement coordinate-system coordinate calculating section 21 with a color predetermined as a color of the work implement 1A. In addition, other than the method of filling an area inside the contour line of the work implement 1A with a particular color, a method of copying and pasting corresponding pixels on a work-implement side-surface image may be used for generation of a work-implement-1A drawing image. Since an image which is the same as an image (i.e. an image of a real object) formed on the work-implement side-surface image can be displayed on the display monitor 18 by creating a drawing image in this manner, occurrence of a sense of discomfort felt by an operator can be suppressed considerably easily. In addition, a method of deforming a previously prepared image or the like in line with a contour or other methods may be used.

(Action and Effects of Work-Implement External-Shape Measurement System)

(1) According to a measurement system constituted by the image-capturing device 19 and the measurement controller 20 as mentioned above, a user only has to attach three or more known-point markers 40 on a side surface of the work implement 1A, and perform operation of capturing an image thereof (work-implement side-surface image) by the image-capturing device 19 when he/she is to acquire external-shape information on the work implement 1A (e.g. the bucket 4). After the work-implement side-surface image is captured, on the basis of the work-implement side-surface image and an internal parameter of the image-capturing device 18, the measurement controller 20 calculates an equation for the plane S1 defined by the plurality of known-point markers 40 (a process performed by the image-capturing-position calculating section 23). On the basis of the equation for the plane S1 and positional information on all pixels (work-implement constituting pixels) positioned on the contour line of the work implement 1A on the work-implement side-surface image, the measurement controller 20 computes the coordinate values, in the image-capturing-device coordinate system Co1, of work-implement corresponding points of all the pixels (a process performed by the image-capturing-device coordinate-system coordinate converting section 24). The measurement controller 20 converts the coordinate values to coordinate values in the work-implement coordinate system Co3, and outputs the coordinate values after the conversion to the work-machine controller 50 (a process performed by the work-implement coordinate-system coordinate converting section 25). Since thereby positional information on work-implement corresponding points of all pixels positioned on the contour line of the work implement 1A in the work-implement side-surface image can be acquired easily, accurate external-shape information on the work machine 1A can be measured simply and easily as compared to the conventional technology. As a result, MC and MG in line with the actual shape of the work implement 1A are executed, the degrees of accuracy of MC and MG are improved, and so improvement of the work efficiency can be expected.

(2) In addition, the measurement controller 20 (the image-capturing-device coordinate-system coordinate converting section 24) in the present embodiment extracts the contour line of the work implement 1A in a work-implement side-surface image by image processing, and, on the basis of an equation for the plane S1, and positional information on pixels on the contour line (e.g. all pixels on the contour line) in the work-implement side-surface image, computes the coordinate values, in the image-capturing-device coordinate system Co1, of work-implement corresponding points of the pixels. Thereby, positional information on the external shape (contour) of the work implement 1A as seen in a side view can be acquired automatically by the measurement controller 20.

(3) In addition, the measurement controller 20 (the work-implement coordinate-system drawing-image generating section 22) in the present embodiment can generate a work-implement-1A drawing image in the work-implement coordinate system Co3 on the basis of the coordinate values of the work-implement corresponding points in the work-implement coordinate system Co3 that are obtained through conversion at the work-implement coordinate-system coordinate converting section 25. Thereby, the external shape of the work-implement-1A drawing image displayed on the display monitor 18 more accurately reflects a real object, it is possible, therefore, to prevent a sense of discomfort from being caused to an operator due to dissimilarity between the image of the work implement 1A and the real object.

(4) In addition, by the measurement controller 20 computing the coordinate values, in the image-capturing-device coordinate system Co1, of work-implement corresponding points of all pixels constituting the work implement 1A on a work-implement side-surface image (the image-capturing-device coordinate-system coordinate converting section 24), and arranging (mapping) pixels which are the same as pixels corresponding to the individual coordinate values to thereby generate a work-implement-1A drawing image (the work-implement coordinate-system drawing-image generating section 22), it is possible to make the visual appearance of the work-implement-1A drawing image displayed on the display monitor 18 more accurately reflect the real object.

Note that although the position of the plane S1 in the image-capturing-device coordinate system Co1 is identified on the basis of a side-surface image of the work implement 1A to which three known-point markers 40 are attached in the embodiment explained above, a technique of identifying the position of the plane S1 is not limited to this. For example, methods that may be used include: (1) a method in which three or more markers 40 are projected onto a side surface of the work implement 1A from a projection device such as a projector whose positional relationship with the image-capturing device 19 is known, images of the markers 40 are captured in a work-implement side-surface image with the image-capturing device 19, and an equation for the plane S1 is computed from the pixel positions of the markers 40 on the work-implement side-surface image; (2) a method in which an image of a side surface of the work implement 1A is captured by each of a plurality of image-capturing devices (e.g. a stereo camera) whose positional relationship to each other are known, and distances (positions) to three points on two work-implement side-surface images are computed on the basis of the distance(s) between the plurality of image-capturing devices to thereby compute an equation for the plane S1; (3) a method in which distance information on three or more points on a side surface of the work implement 1A is acquired by a distance measuring device (e.g. a laser, LED or ultrasonic distance sensor) whose positional relationship with the image-capturing device 19 is known, and which can measure the distance between the image-capturing device 19 and a point on the side surface of the work implement 1A to thereby compute an equation for the plane S1; and the like. Note that identification of the plane S1 is not limited to a method for identification from the positions of three or more points on the plane S1 like the ones explained above. For example, the plane S1 can be identified only from the position of one point on the plane S1 if an inclination of the plane S1 (e.g. a normal vector) can be known.

(System Configuration of Hydraulic Excavator)

Next, use, in the work-machine controller 50, of the coordinate values and a drawing image of the work implement 1A that are output from the measurement controller 20 is explained.

Figure 9:
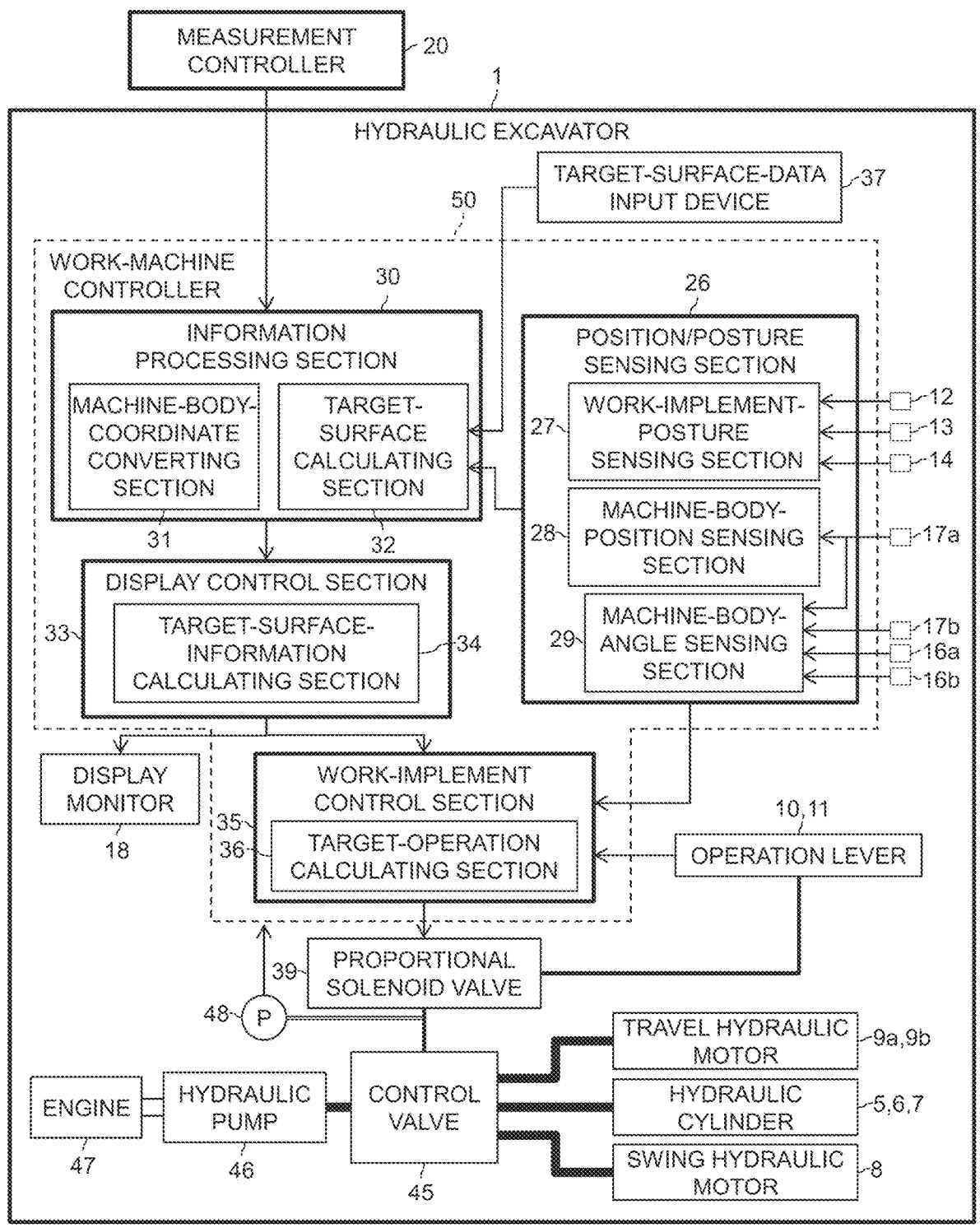
FIG. 9 is a functional block diagram of a system for the hydraulic excavator according to the first embodiment of the present embodiment.

FIG. 9 is a system configuration diagram of the hydraulic excavator 1 in FIG. 1. The hydraulic excavator 1 in the present embodiment includes: an engine 47; a hydraulic pump 46 and a pilot pump (not illustrated) that are mechanically coupled to an output shaft of the engine 47 and are driven by the engine 47; the operation levers 10 and 11 each of which outputs to a control valve 45 via a proportional solenoid valve 39, a hydraulic fluid that is delivered from the pilot pump and then reduced in pressure in accordance with an operation amount of each of the operation levers 10 and 11, as a control signal for each of the hydraulic actuators 5 to 9; a plurality of control valves 45 that control the flow rate and direction of a hydraulic operating fluid guided from the hydraulic pump 46 to each of the hydraulic actuators 5 to 9 on the basis of a control signal (pilot pressure) output from the operation lever 10 or 11 or a proportional solenoid valve 39; a plurality of pressure sensors 48 that sense the pressure value of a pilot pressure acting on each control valve 45; the work-machine controller 50 that computes a corrected target pilot pressure on the basis of the position and posture of the work implement 1A, and other machine-body information, and outputs a command voltage that can generate the corrected target pilot pressure to a proportional solenoid valve 27; and the target-surface-data input device 37 for inputting information on a target surface to be formed by the work implement 1A into the work-machine controller 50.

The hydraulic pump 46 is controlled mechanically in terms of its torque and flow rate such that the machine body operates in accordance with a target output power of each of the hydraulic actuators 5 to 8.

The number of the control valves 45 is the same as the number of the control-target hydraulic actuators 5 to 8, but one of the control valves 45 is representatively illustrated in FIG. 9. Two pilot pressures act on each control valve to move a spool therein in one direction or the other direction of the axial directions. For example, a boom-raising pilot pressure and a boom-lowering pilot pressure act on a control valve 45 for the boom cylinder 5.

The pressure sensors 48 sense pilot pressures acting on each control valve 45, and the number of the pressure sensors 48 may be twice the number of the control valves. The pressure sensors 48 are provided directly under the control valves 45, and sense pilot pressures actually acting on the control valves 45.

Although there are the plurality of proportional solenoid valves 39, one block is representatively illustrated in FIG. 9. There are two types of proportional solenoid valves 39. One of the types is pressure-reducing valves that directly output pilot pressures input from the operation levers 10 and 11 or reduce the pilot pressures input from the operation levers 10 and 11 to desired corrected target pilot pressures designated by command voltages and output the reduced pilot pressures. The other of the types is pressure-increasing valves that reduce pilot pressures input from pilot pumps to desired corrected target pilot pressures designated by command voltages and output the reduced pilot pressures in a case where pilot pressures higher than pilot pressures output by the operation levers 10 and 11 are required. In a case where a pilot pressure higher than a pilot pressure being output from the operation lever 10 or 11 is required as a pilot pressure for a control valve 45, a pilot pressure is generated via a pressure-increasing valve. In a case where a pilot pressure lower than a pilot pressure being output from the operation lever 10 or 11 is required as a pilot pressure for a control valve 45, a pilot pressure is generated via a pressure-reducing valve. In a case where a pilot pressure is not being output from the operation levers 10 and 11, a pilot pressure is generated via a pressure-increasing valve. That is, pressure-reducing valves and pressure-increasing valves allow pilot pressures with pressure values different from pilot pressures input from the operation levers 10 and 11 (pilot pressures based on operator operation) to act on control valves 45, and this makes it possible to cause hydraulic actuators which are control targets of the control valves 45 to perform desired operation.

The maximum number of each of pressure-reducing valves and pressure-increasing valves that can be present per control valve 45 is two. For example, in the present embodiment, two pressure-reducing valves and two pressure-increasing valves are provided for the control valve 45 of the boom cylinder 5. Specifically, the hydraulic excavator 1 includes: a first pressure-reducing valve provided in a first line that guides a boom-raising pilot pressure from the operation lever 11 to a control valve 45; a first pressure-increasing valve provided in a second line that guides a boom-raising pilot pressure from the pilot pump to the control valve 45, bypassing the operation lever 11; a second pressure-reducing valve provided in a third line that guides a boom-lowering pilot pressure from the operation lever 11 to the control valve 45; and a second pressure-increasing valve provided in a fourth line that guides a boom-lowering pilot pressure from the pilot pump to the control valve 45, bypassing the operation lever 11.

In the present embodiment, there are no proportional solenoid 39 for control valves 45 of the travel hydraulic motors 9a and 9b and the swing hydraulic motor 8. Accordingly, the travel hydraulic motors 9a and 9b and the swing hydraulic motor 8 are driven on the basis of pilot pressures output from the operation levers 10 and 11.

(Configuration of Work-Machine Controller)

The work-machine controller 50 includes a position/posture sensing section 26, an information processing section 30, a display control section 33 and a work-implement control section 35.

The position/posture sensing section 26 includes a work-implement-posture sensing section 27, a machine-body-position sensing section 28 and a machine-body-angle sensing section 29. The position/posture sensing section 26 receives an input of various types of sensor information, and outputs postural information, machine-body positional information and machine-body angle information on the work implement 1A.

The work-implement-posture sensing section 27 senses the posture of the work implement 1A in the machine-body coordinate system Co4 on the basis of outputs of the posture sensors 12, 13 and 14 attached to the work implement 1A. More specifically, on the basis of information from the boom-angle sensor 12, the arm-angle sensor 13 and the bucket-angle sensor 14, the work-implement-posture sensing section 27 senses postural information on the work implement 1A like the angles of pivoting motion $\alpha$, $\beta$ and $\gamma$ (see FIG. 3) of the boom 2, the arm 3 and bucket 4.

The machine-body-position sensing section 28 senses machine-body positional information on the basis of information obtained from the first GNSS antenna 17a.

The machine-body-angle sensing section 29 senses the inclination angle $\theta$ (see FIG. 3) by the machine-body front-rear-inclination-angle sensor 16a, senses the left-right-direction inclination angle $\varphi$ (not illustrated) by the machine-body left-right-inclination-angle sensor 16b, senses the azimuth of the machine body from positional information on the first GNSS antenna 17a and the second GNSS antenna 17b, and obtains machine-body angle information. Note that although the machine-body positional information is obtained on the basis of information on the first GNSS antenna 17a in the present embodiment, positional information on the second GNSS antenna 17b may be used or a three-dimensional surveying instrument such as a total station may be used. In addition, although azimuth information on the machine body is sensed from positional information on the first GNSS antenna 17a and the second GNSS antenna 17b in the present embodiment, methods that may be adopted include a method that uses an electromagnetic compass and a method that uses a swing-angle sensor.

The information processing section 30 includes a machine-body-coordinate converting section 31, and a target-surface calculating section 32. Input data of the information processing section 30 includes: work-implement coordinate-system coordinate values and a work-implement coordinate-system drawing image output by the measurement controller 20; target-surface data input by the target-surface-data input device 37; and postural information, machine-body positional information and machine-body angle information on the work implement output by the position/posture sensing section 26. In addition, output data of the information processing section 30 includes, in addition to the postural information, machine-body positional information and machine-body angle information on the work implement 1A input from the position/posture sensing section 26, machine-body coordinate-system coordinate-value information and machine-body coordinate-system drawing-image information on the work implement 1A obtained by the machine-body-coordinate converting section 31, and information on a target surface in the machine-body coordinate system Co4 obtained by the target-surface calculating section 32.

Figure 10:
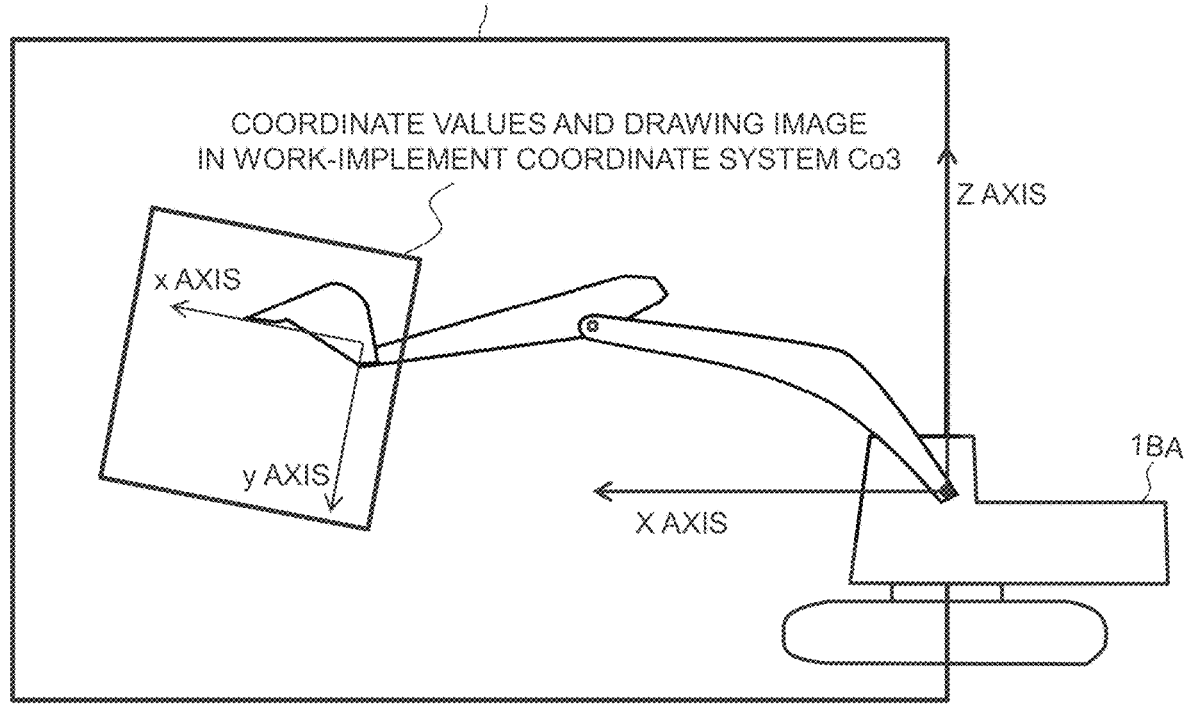
FIG. 10 is a figure representing conversion from the work-implement coordinate system to a machine-body coordinate system.

The machine-body-coordinate converting section 31 converts the coordinate values of work-implement corresponding points (machine-body coordinate-system coordinate-value information) and a work-implement-1A drawing image (machine-body coordinate-system drawing-image information) in the work-implement coordinate system Co3 that are output from the measurement controller 20 (the work-implement coordinate-system coordinate converting section 25 and the work-implement coordinate-system drawing-image generating section 22) to coordinate values in the machine-body coordinate system Co4 which is a two-dimensional coordinate system set for the hydraulic excavator 1. Specifically, on the basis of postural information on the work implement 1A sensed by the work-implement-posture sensing section 27 of the position/posture sensing section 26, the machine-body-coordinate converting section 31 translates and/or rotates the work-implement coordinate-system coordinate values and the work-implement coordinate-system drawing image output by the measurement controller 20, such that the work-implement coordinate-system coordinate values and the work-implement coordinate-system drawing image match the actual position and/or posture of the work implement 1A as illustrated in FIG. 10, and projects the work-implement coordinate-system coordinate values and the work-implement coordinate-system drawing image onto the X-Z plane in the machine-body coordinate system Co4 to thereby convert the work-implement coordinate-system coordinate values and the work-implement coordinate-system drawing image to coordinate values in the machine-body coordinate system Co4. Note that amounts of a translation and/or a rotation for converting the work-implement coordinate-system coordinate values and the work-implement coordinate-system drawing image to the coordinate values in the machine-body coordinate system Co4 may be obtained by comparing the coordinate values, in the work-implement coordinate system Co3, of two different two points and the coordinate values in the machine-body coordinate system Co4 that are measured by a measurement device such as a total station when the angles of pivoting motion $\alpha$, $\beta$ and $\gamma$ of the boom 2, the arm 3 and the bucket 4 are known.

Figure 11:
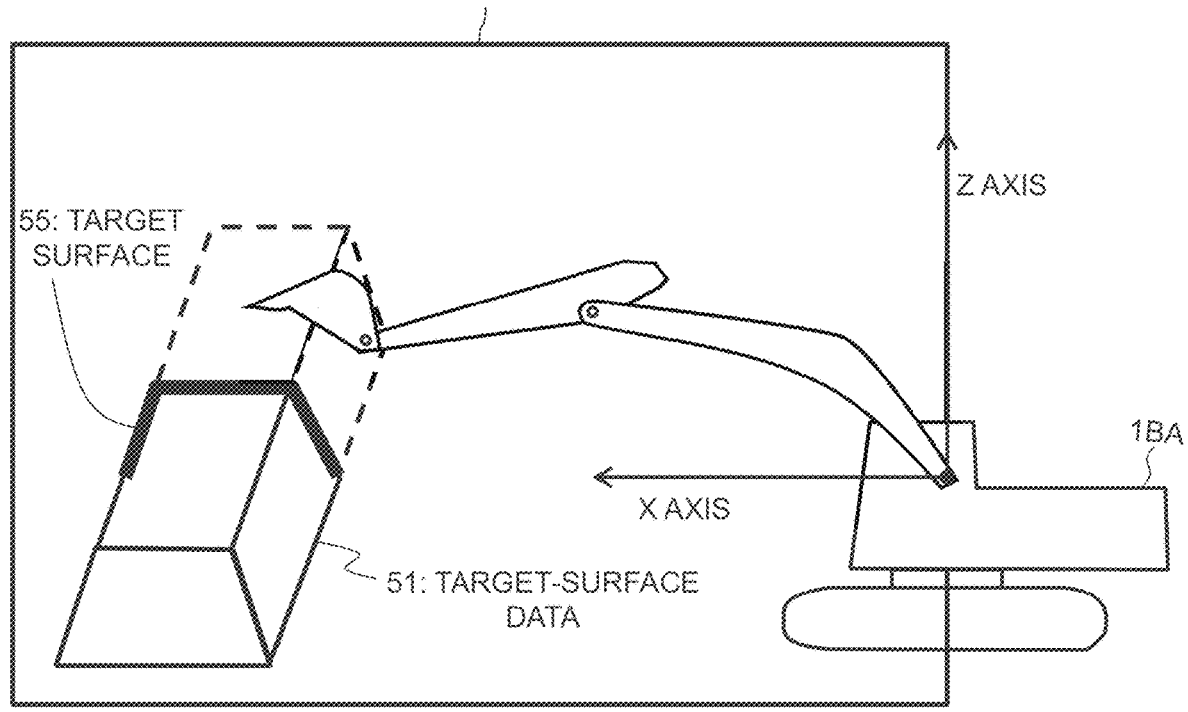
FIG. 11 is a figure illustrating a target surface in the machine-body coordinate system.

As illustrated in FIG. 11, the target-surface calculating section 32 calculates a line segment along which target-surface data (three-dimensional data) 51 input through the target-surface-data input device 37 and the X-Z plane of the machine-body coordinate system Co4 intersect, and sets the line segment as the target surface 55. The X-Z plane of the machine-body coordinate system Co4 is obtained on the basis of machine-body positional information output by the position/posture sensing section 26 and machine-body angle information output by the machine-body-angle sensing section 29. Although the target-surface data 51 input through the target-surface-data input device 37 is assumed to be three-dimensional data in the present embodiment, the target-surface data 51 may be two-dimensional data, that is, line-segment data indicating a target surface. In addition, in a case where the target-surface data is two-dimensional data, it is not necessary to use machine-body positional information on the machine-body-position sensing section 28, and a machine-body azimuth information on the machine-body-angle sensing section 29.

On the basis of the work-implement-1A drawing image in the work-implement coordinate system Co4 that has coordinates obtained through the conversion at the machine-body-coordinate converting section 31, the coordinate values, in the machine-body coordinate system Co4, of the work-implement corresponding points that are obtained through the conversion at the machine-body-coordinate converting section 31, and the posture of the work implement 1A in the machine-body coordinate system Co4 that is obtained by the posture sensors 12, 13 and 14, the display control section 33 displays the work-implement-1A drawing image on the display monitor 18 in line with the posture of the work implement 1A in the machine-body coordinate system Co4. The display control section 33 includes a target-surface-information calculating section 34, and input data of the display control section 33 includes: the postural information, the machine-body positional information and the machine-body angle information on the work implement 1A that are output by the information processing section 30; the machine-body coordinate-system coordinate-value information and the machine-body coordinate-system drawing-image information on the work implement 1A that are output from the information processing section 30; and information on a target surface on the machine-body-coordinate-system X-Z plane. Additionally, in addition to these types of input information, output data includes work-implement/target-surface vector information. The output information is input to the display monitor 18, and presented to a user.

Figure 12:
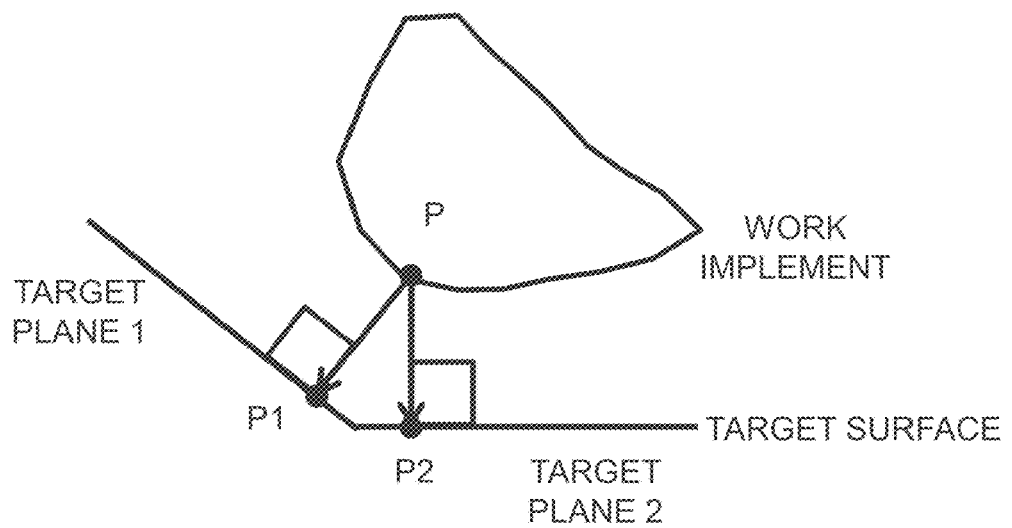
FIG. 12 is a figure illustrating an example of a relationship between a work implement and a target surface.

The target-surface-information calculating section 34 is explained by using FIG. 12 in which an example of a positional relationship between the work implement 1A and the target surface 55 is illustrated. First, the target-surface-information calculating section 34 obtains nearest points (a point P1 and a point P2) on planes (a target plane 1 and a target plane 2 in FIG. 12) that are among a plurality of planes (hereinafter, referred to as "target planes" in some cases) constituting the target surface 55 and that are present at a certain distance from the work implement 1A, for a point on the contour line of the work implement 1A (a point P in FIG. 12). Next, work-implement/target-surface vectors (a vector PP1 and a vector PP2) from the point on the work-implement contour line (the point P) to the nearest points (the point P1 and the point P2) on the target planes are obtained. These calculations are performed for all points on the work-implement contour line (i.e. all work-implement coordinate-system coordinate values) input from the measurement controller 20 to obtain information to be output to the display monitor 18. Although information on vectors from a point on the work implement 1A to nearest points on planes of the target surface 55 is used as output information in the present embodiment, distance information may be output, or a distance in the vertical direction from a point on the work implement 1A to the target surface 55 or the like may be output. In addition, although the calculations are performed for all points on the contour line of the work implement 1A in the present embodiment, the calculations may be performed only for particular points, like points at the tip of the work implement 1A or points on the back of the work implement 1A.

Figure 13:
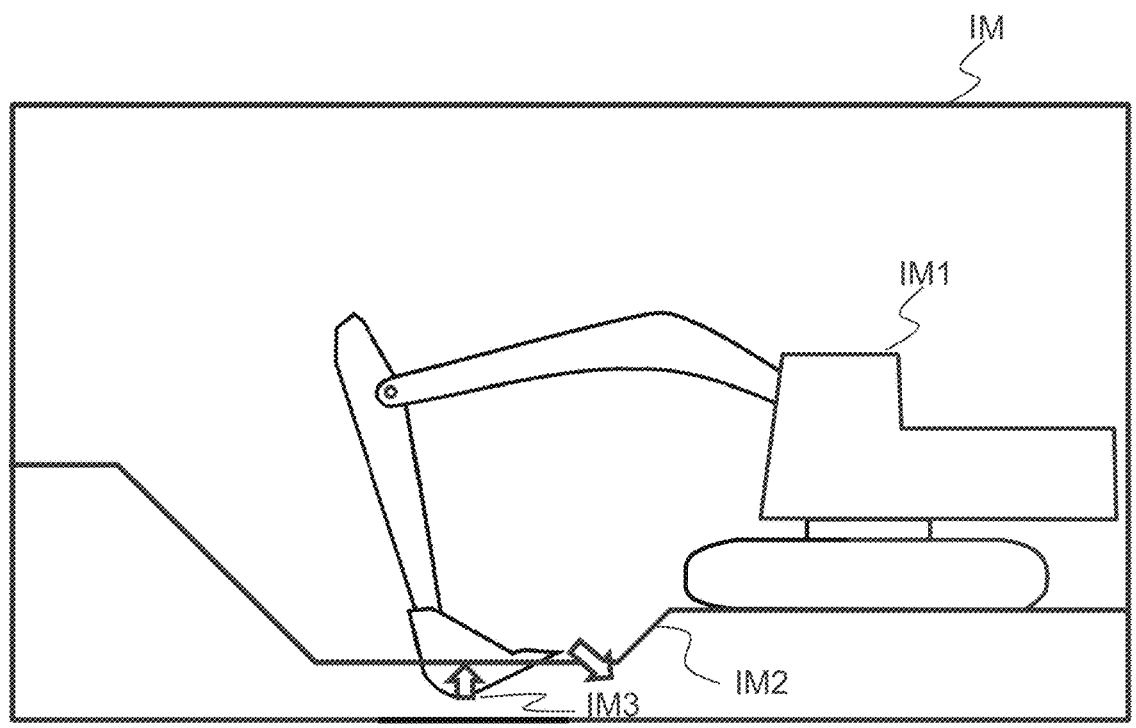
FIG. 13 is a figure illustrating an example of a screen displayed on a display monitor 18.

An example of a screen displayed on the display monitor 18 is illustrated in FIG. 13. On a guidance screen IM, a machine-body image IM1 drawn on the basis of the machine-body coordinate-system drawing-image information, a target-surface image IM2 drawn on the basis of data of a target surface on the X-Z plane of the machine-body coordinate system Co4, and a work-implement/target-surface vector image IM3 drawn on the basis of the work-implement/target-surface vector information are displayed.

Here, the work-implement/target-surface vector image IM3 is a drawn image of a vector which is among vectors relative to corresponding target planes in the work-implement/target-surface vector information output at the target-surface-information calculating section 34, and which has the smallest vector size among the vectors. Note that the vector size in a case where a point on the work-implement contour line has gone under the target surface 55 has a negative value. Note that other than the one mentioned as an example in the present embodiment, information output from the target-surface-information calculating section 34, and information obtained by processing the information may be displayed as the guidance screen IM. In addition, although only the guidance screen IM displayed on the display monitor 18 is explained as a machine guidance function in the present embodiment, information may be presented by sounds, vibration and the like, other than such visual information.

On the basis of positional information on the predetermined target surface 55 input from the information processing section 30, the coordinate values, in the machine-body coordinate system Co4, of work-implement corresponding points that are obtained through conversion at the machine-body-coordinate converting section 31, and the posture of the work implement 1A in the machine-body coordinate system Co4 obtained by the posture sensors 12, 13 and 14, the work-implement control section 35 controls the work implement 1A (the hydraulic cylinders 5, 6 and 7) such that control points of the work implement 1A corresponding to the work-implement corresponding points are kept above the target surface 55. The work-implement control section 35 includes a target-operation calculating section 36. Input data of the work-implement control section 35 includes: an output of the display control section 33; postural information on the work implement 1A of the position/posture sensing section 26; and operation inputs to an operation input device including the operation levers 10 and 11. Output data of the work-implement control section 35 includes control signals of the proportional solenoid valves 39.

On the basis of the input information explained above (the postural information on the work implement 1A, and the operation input information on the operation levers 10 and 11), the target-operation calculating section 36 predicts a direction and a speed of a motion of the work implement 1A. For example, in a case where the work implement 1A is predicted to go under the target surface 55 at this time, a control signal giving an instruction on reducing or increasing in pilot pressure is output to the solenoid proportional valves 39 such that a motion that prevents the work implement 1A from going under the target surface 55 is produced. The pilot pressures corrected by the solenoid proportional valves 39 drive the control valves 45, and the hydraulic cylinders 5, 6 and 7 are driven as appropriate on the basis of the operation to thereby prevent the work implement 1A from going under the target surface 55. Note that although the solenoid proportional valves 39 control the pilot pressures in the present embodiment, the solenoid proportional valves may directly control hydraulic-operating-fluid pressures of actuators.

According to the work-machine controller 50 (mainly, the display control section 33 and the work-implement control section 35) in the present embodiment, MG and MC are performed by using coordinate information and a drawing image that are calculated on the basis of a side-surface image of the work implement 1A at the measurement controller 20, and that match well with the actual shape of the work implement 1A. Thereby, the degree of accuracy of guidance information (e.g. the work-implement/target-surface vector image IM3, information on a distance from the work implement 1A to the target surface 55, etc.) displayed on the display monitor 18 by the display control section 33 improves, and in addition, it is possible to suppress a sense of discomfort felt by an operator in terms of a work-implement-1A drawing image displayed on the display monitor 18. Furthermore, the work-implement control section 35 can perform accurate MC even if the work implement 1A has a shape that requires many control points such as curved sections and protruding sections.

Second Embodiment

A second embodiment is characterized in that the image-capturing device 19 and the measurement controller 20 are mounted on the hydraulic excavator 1, and a machine guidance function and a machine control function are provided while measurement of external-shape information on the work implement 1A (machine-body coordinate-system coordinate-value information and machine-body coordinate-system drawing-image information on the work implement 1A) is being performed in real time. Note that portions that are the same as in the previous embodiment are given the same signs, and explanations thereof are omitted as appropriate in some cases.

Figure 14:
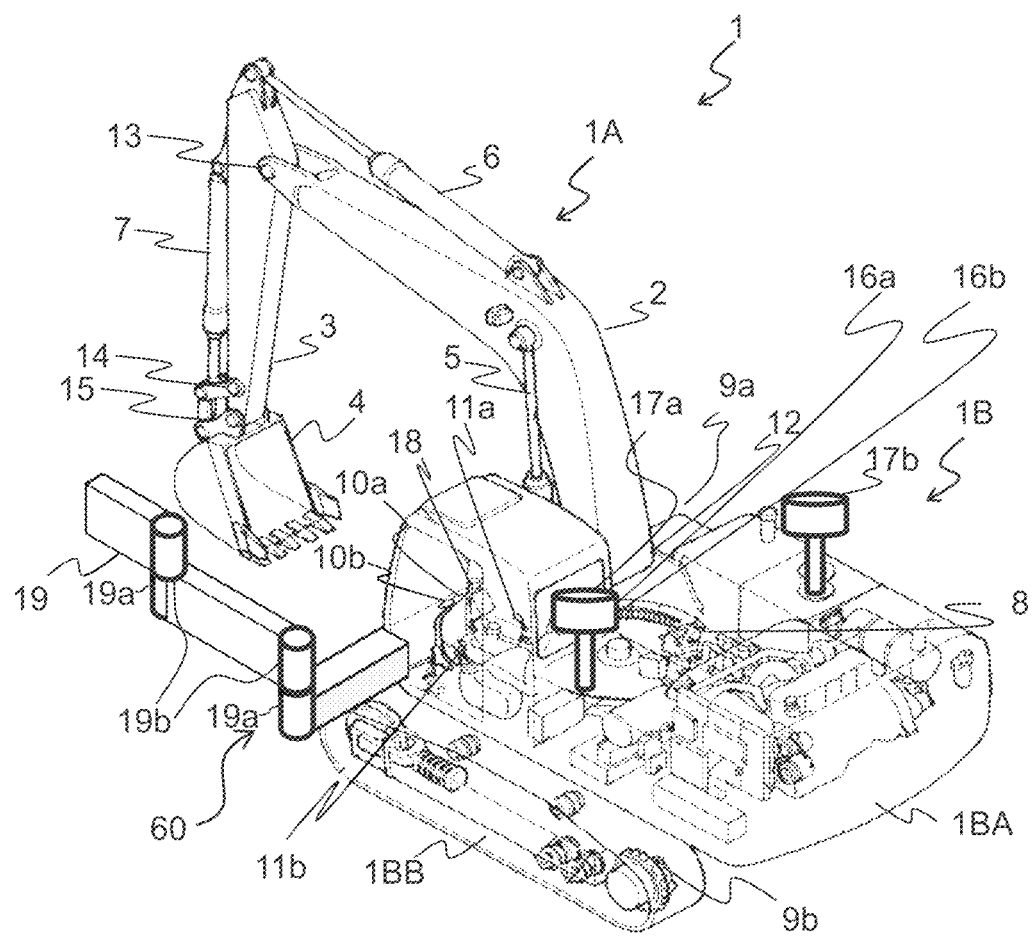
FIG. 14 is a configuration diagram of the hydraulic excavator according to a second embodiment of the present invention.
Figure 15:
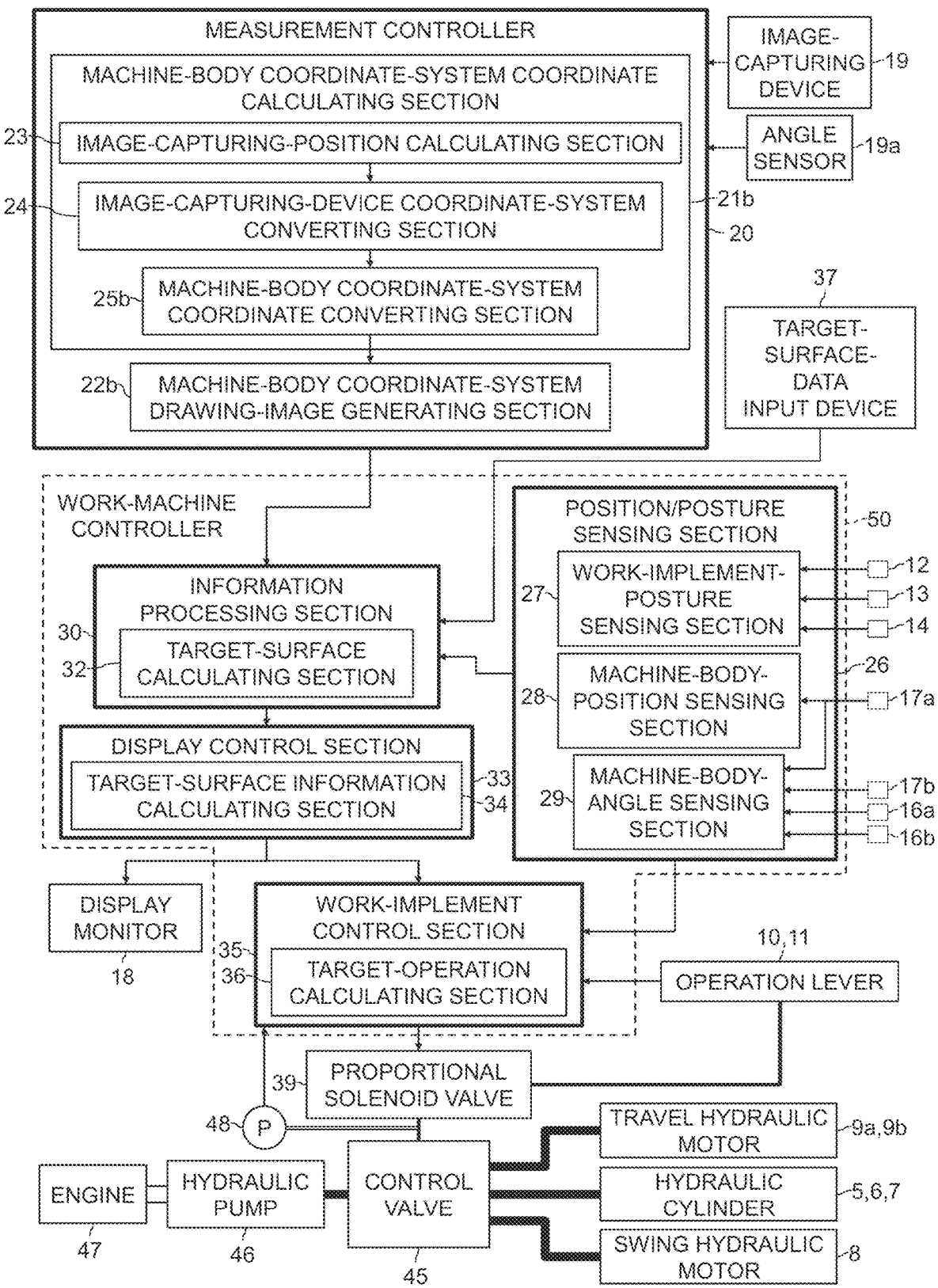
FIG. 15 is a functional block diagram of a system according to the second embodiment of the present invention.

As illustrated in FIG. 14, the image-capturing device 19 in the present embodiment is attached at a portion forward of the upper swing structure 1BA via a support device (articulated arm) 60. The support device 60 in FIG. 14 is a horizontal articulated arm formed by coupling a plurality of horizontal arms, and can change the orientation and/or position of the image-capturing device 19 in the machine-body coordinate system Co4 by driving an actuator (e.g. motor) 19b embedded in each joint. In addition, each joint of the support device 60 is provided with an angle sensor (image-capturing-device sensor) 19a that senses a rotation angle of each horizontal arm, and a sensing value of the angle sensor 19a is output to the measurement controller 20 as illustrated in FIG. 15. Note that although the support device 60 is a horizontal articulated arm in the present embodiment, an arm that can move in the vertical direction or other support devices can also be used as the support device 60.

FIG. 15 is a system configuration diagram of the hydraulic excavator 1 according to the present embodiment. As illustrated in this figure, the hydraulic excavator 1 in the present embodiment includes the image-capturing device 19, the measurement controller 20 and the work-machine controller 50.

In the present embodiment, the image-capturing device 19 captures work-implement side-surface images at predetermined intervals, and on the basis of the work-implement side-surface images, the measurement controller 20 calculates the machine-body coordinate-system coordinate values and a machine-body coordinate-system drawing image of the work implement 1A in real time, and outputs the machine-body coordinate-system coordinate values and machine-body coordinate-system drawing image to the work-machine controller 50. It should be noted, however, that although the measurement controller 20 in the first embodiment outputs coordinates values and a drawing image in the work-implement coordinate system Co3, coordinate values and a drawing image in the machine-body coordinate system Co4 can be directly computed since the image-capturing device 19 is attached to the machine body (upper swing structure 1BA) of the hydraulic excavator 1 in the present embodiment. In addition, the work-machine controller 50 in the present embodiment provides a machine guidance function and a machine control function to a user on the basis of information output from the measurement controller 20 in real time.

The measurement controller 20 includes a machine-body coordinate-system coordinate calculating section 21b, and a machine-body coordinate-system drawing-image generating section 22b. The measurement controller 20 receives an input of a side-surface image of the work implement 1A captured by the image-capturing device 19, and positional information and orientation information, in the machine-body coordinate system, of the image-capturing device 19 from the angle sensor 19a.

The machine-body coordinate-system coordinate calculating section 21b includes the image-capturing-position calculating section 23, the image-capturing-device coordinate-system coordinate converting section 24 and a machine-body coordinate-system coordinate converting section 25b. The machine-body coordinate-system coordinate calculating section 21b receives an input of a side-surface image of the work implement 1A captured by the image-capturing device 19, outputs the machine-body coordinate-system coordinate values of a point designated on the side-surface image of the work implement 1A, and also outputs a machine-body coordinate-system drawing image matching the shape and dimensions of the work implement 1A in the machine-body coordinate system Co4. In addition, although the machine-body coordinate-system coordinate values of work-implement corresponding points of all pixels on the contour line of the work implement in a work-implement side-surface image are output in the present embodiment also, it is needless to say that other methods may be adopted in a similar manner to the first embodiment (e.g. only the coordinate values of work-implement corresponding points of some pixels on the contour line are output).

In the measurement controller 20, the image-capturing-position calculating section 23 and the image-capturing-device coordinate-system coordinate converting section 24 at the machine-body coordinate-system coordinate calculating section 21b perform calculations similar to those in the first embodiment. On the basis of positional information and orientation information, in the machine-body coordinate system Co4, of the image-capturing device 19 input from the angle sensor 19a, the machine-body coordinate-system coordinate converting section 25b translates and/or rotates coordinate values in the image-capturing-device coordinate system Co1, and converts the coordinate values to coordinate values in the machine-body coordinate system Co4. In addition, the machine-body coordinate-system drawing-image generating section 22b also generates a drawing image after conversion of its coordinates to those in the machine-body coordinate system Co4 similarly.

In the present embodiment, information input from the measurement controller 20 to the work-machine controller 50 (the machine-body coordinate-system coordinate values and a machine-body coordinate-system drawing image of the work implement 1A) is already information in the machine-body coordinate system Co4. Because of this, although the information processing section 30 of the work-machine controller 50 in the present embodiment does not have the machine-body-coordinate converting section 31 in the first embodiment, configurations and processing contents of the other sections are the same. In addition, the work-implement-posture sensing section 27 at the position/posture sensing section 26 is not required since the posture of the work implement 1A can be sensed also by the measurement controller 20. Processing contents at the display control section 33 and the work-implement control section 35 are similar to those in the first embodiment.

In the thus-configured hydraulic excavator 1 in the present embodiment, the measurement controller 20 measures the positional and shape information on the work implement 1A in real time. Because of this, a user is not required to measure the shape and the like of the work implement 1A in advance unlike the first embodiment, but work-implement shape information can be acquired simply and easily. In addition, since the position and shape of the work implement 1A are acquired in real time, an accurate work-implement shape can be measured even in a case where wear, deformation and the like have occurred to the work implement 1A, and the work-implement shape can be presented to a user in an easy-to-understand manner in a machine guidance function by the display control section 33. In addition, accurate control can be performed by the work-implement control section 35 in accordance with the actual state of the work implement.

Note that the present invention is not limited to the embodiments explained above, but includes various variants within a scope not deviating from the gist of the present invention. For example, the present invention is not limited to those including all the configurations explained in the embodiments explained above, but also includes those from which some of the configurations are eliminated. In addition, some of configurations related to an embodiment can be added to or replace configurations according to another embodiment.

In addition, each configuration according to the controllers 20 and 50 explained above, and the function, execution process and the like of such each configuration, may be partially or entirely realized by hardware (e.g. designing logic to execute each function in an integrated circuit, etc.). In addition, configurations according to the controllers 20 and 50 explained above may be programs (software) that are read out and executed by a calculation processing device (e.g. a CPU) to realize each function according to the configurations of the controllers 20 and 50. Information according to the programs can be stored on, for example, a semiconductor memory (a flash memory, an SSD, and the like), a magnetic storage device (a hard disk drive, and the like), a recoding medium (a magnetic disk, an optical disc, and the like) and the like.

DESCRIPTION OF REFERENCE CHARACTERS

1: Hydraulic excavator (work machine)
1A: Work implement (front work implement)
1B: Machine body
1BA: Upper swing structure
1BB: Lower track structure
2: Boom
3: Arm
4: Bucket
5: Boom cylinder
6: Arm cylinder
7: Bucket cylinder
10, 11: Operation lever
12: Boom-angle sensor (posture sensor)
13: Arm-angle sensor (posture sensor)
14: Bucket-angle sensor (posture sensor)
18: Display monitor (display device)
19: Image-capturing device
20: Measurement controller 21: Work-implement coordinate-system coordinate calculating section
22: Work-implement coordinate-system drawing-image generating section
23: Image-capturing-position calculating section
24: Image-capturing-device coordinate-system coordinate converting section
25: Work-implement coordinate-system coordinate converting section
39: Proportional solenoid valve
40: Known-point marker
50: Work-machine controller

The invention claimed is:

1. A work-implement external-shape measurement system including a measurement controller that measures an external shape of a work implement provided to a work machine, the work-implement external-shape measurement system comprising:
an image-capturing device that captures an image of a side surface of the work implement, wherein
the measurement controller is configured to
compute a position of a plane representing the side surface of the work implement in an image-capturing-device coordinate system that is a three-dimensional coordinate system set for the image-capturing device, the position being computed on a basis of the image of the side surface of the work implement, the image being captured by the image-capturing device, and an internal parameter of the image-capturing device,
compute a coordinate value of a point on the work implement in the image-capturing-device coordinate system, the point corresponding to any pixel constituting the work implement on the image, on a basis of information on a position of the pixel on the image and the position of the plane, and
convert the coordinate value of the point on the work implement in the image-capturing-device coordinate system, the point corresponding to the pixel, to a coordinate value in a work-implement coordinate system that is a two-dimensional coordinate system set for the work implement, and output the coordinate value in the work-implement coordinate system to a work-machine controller of the work machine.

2. The work-implement external-shape measurement system according to claim 1, wherein
the measurement controller is configured to extract a contour line of the work implement on the image, and, on a basis of information on a position of any pixel on the contour line on the image and the position of the plane, compute a coordinate value of a point on the work implement in the image-capturing-device coordinate system, the point corresponding to the any pixel.

3. The work-implement external-shape measurement system according to claim 1, wherein
the measurement controller is configured to extract a contour line of the work implement on the image, and, on a basis of information on positions of all pixels on the contour line on the image and the position of the plane, compute coordinate values of points on the work implement in the image-capturing-device coordinate system, the points corresponding to all the pixels.

4. The work-implement external-shape measurement system according to claim 1, wherein
a calculation of the coordinate value of the point on the work implement in the image-capturing-device coordinate system, the point corresponding to the pixel, is performed for a plurality of points on the work implement, the points corresponding to all pixels constituting the work implement on the image.

5. The work-implement external-shape measurement system according to claim 1, wherein
the measurement controller is configured to compute the position of the plane on a basis of pixel positions of three or more markers on the image, the markers being attached to the side surface of the work implement at known distances from each other.

6. The work-implement external-shape measurement system according to claim 1, further comprising:
a projection device whose positional relationship with the image-capturing device is known, wherein
a marker projected onto the side surface of the work implement from the projection device is captured in the image, and
the measurement controller is configured to compute the position of the plane on a basis of a pixel position of the marker on the image.

7. The work-implement external-shape measurement system according to claim 4, wherein
the image-capturing device includes a plurality of image-capturing devices whose positional relationships to each other are known, and
the measurement controller is configured to compute the position of the plane on a basis of distances between the plurality of image-capturing devices.

8. The work-implement external-shape measurement system according to claim 4, further comprising:
a distance measuring device that measures a distance between the image-capturing device and any point on the side surface of the work implement, wherein
the measurement controller is configured to compute the position of the plane on a basis of information on distances between three or more points on the side surface of the work implement, the distances being measured by the distance measuring device.

9. The work-implement external-shape measurement system according to claim 1, wherein
the measurement controller is configured to generate a drawing image of the work implement in the work-implement coordinate system on a basis of the coordinate value of the point on the work implement in the work-implement coordinate system, the point corresponding to the pixel.

10. A work-implement external-shape display system comprising:
the work-implement external-shape measurement system according to claim 1;
the work-machine controller; and
a display device mounted on the work machine, wherein
on a basis of the coordinate value of the point on the work implement in the work-implement coordinate system, the point corresponding to the pixel, the measurement controller is configured to generate a drawing image of the work implement in the work-implement coordinate system,
the work-machine controller is configured to
convert the coordinate value of the point on the work implement in the work-implement coordinate system, the coordinate value being output from the measurement controller, the point corresponding to the pixel, to a coordinate value in a machine-body coordinate system that is a two-dimensional coordinate system set for the work machine, sense a posture of the work implement in the machine-body coordinate system on a basis of an output of a posture sensor attached to the work implement, and on a basis of the drawing image of the work implement in the work-implement coordinate system, the coordinate value of the point on the work implement in the machine-body coordinate system, the point corresponding to the pixel, and the posture of the work implement in the machine-body coordinate system, display, on the display device, the drawing image of the work implement in line with the posture of the work implement in the machine-body coordinate system.

11. A work-implement control system comprising:

the work-implement external-shape measurement system according to claim 1; and the work-machine controller, wherein the work-machine controller is configured to convert the coordinate value of the point on the work implement in the work-implement coordinate system, the coordinate value being output from the measurement controller, the point corresponding to the pixel, to a coordinate value in a machine-body coordinate system that is a two-dimensional coordinate system set for the work machine, sense a posture of the work implement in the machine-body coordinate system on a basis of an output of a posture sensor attached to the work implement, and on a basis of positional information on a predetermined target surface, the coordinate value of the point on the work implement in the machine-body coordinate system, the point corresponding to the pixel, and the posture of the work implement in the machine-body coordinate system, control the work implement such that a control point of the work implement, the control point corresponding to the pixel, is kept above the target surface.

12. A work machine including: a work implement; a display device; and a work-machine controller configured to display, on the display device, a positional relationship between a predetermined target surface and the work implement, the work machine comprising:

an image-capturing device configured to capture an image of a side surface of the work implement; and a measurement controller configured to compute a position of a plane representing the side surface of the work implement in an image-capturing-device coordinate system that is a three-dimensional coordinate system set for the image-capturing device, the position being computed on a basis of the image of the side surface of the work implement, the image being captured by the image-capturing device, and an internal parameter of the image-capturing device, compute a coordinate value of a point on the work implement in the image-capturing-device coordinate system, the point corresponding to any pixel constituting the work implement on the image, on a basis of information on a position of the pixel on the image and the position of the plane, convert the coordinate value of the point on the work implement in the image-capturing-device coordinate system, the point corresponding to the pixel, to a coordinate value in a machine-body coordinate system that is a two-dimensional coordinate system set for a machine body of the work machine, and output the coordinate value in the machine-body coordinate system to the work-machine controller, and generate a drawing image of the work implement in the machine-body coordinate system on a basis of the coordinate value of the point on the work implement in the machine-body coordinate system, the point corresponding to the pixel, and output the drawing image to the work-machine controller, wherein the work-machine controller is configured to sense a posture of the work implement in the machine-body coordinate system on a basis of an output of a posture sensor attached to the work implement, and on a basis of the drawing image of the work implement in the machine-body coordinate system, the coordinate value of the point on the work implement in the machine-body coordinate system, the point corresponding to the pixel, and the posture of the work implement in the machine-body coordinate system, display, on the display device, the drawing image of the work implement in line with the posture of the work implement in the machine-body coordinate system.

13. The work machine according to claim 12, wherein, on a basis of positional information on a predetermined target surface, the coordinate value of the point on the work implement in the machine-body coordinate system, the point corresponding to the pixel, and the posture of the work implement in the machine-body coordinate system, the work-machine controller is configured to control the work implement such that a control point of the work implement, the control point corresponding to the point on the work implement, the point corresponding to the pixel, is kept above the target surface.

* * * * *